(12) United States Patent
Nowak et al.

(10) Patent No.: US 7,415,329 B2
(45) Date of Patent: Aug. 19, 2008

(54) SYSTEM AND METHOD OF PROVIDING N-TIERED ENTERPRISE/WEB-BASED MANAGEMENT, PROCEDURE COORDINATION, AND CONTROL OF A GEOSYNCHRONOUS SATELLITE FLEET

(75) Inventors: Thomas Gerard Nowak, Langhorne, PA (US); Srinivasan Ranganathan, Dayton, NJ (US); Manoj K. Chauhan, Delran, NJ (US); Christopher Taylor, Neptune, NJ (US); Anthony William Massaro, Erwinna, PA (US); John Philip Schramm, Doylestown, PA (US); Kevin John Moscatiello, Port Jervis, NY (US); Nicholas Vespasian Chilelli, Bordentown, NJ (US)

(73) Assignee: SES Americom, Inc., Chantilly, VA (US)

( * ) Notice: Subject to any disclaimer, the term of this patent is extended or adjusted under 35 U.S.C. 154(b) by 774 days.

(21) Appl. No.: 10/977,402

(22) Filed: Nov. 1, 2004

(65) Prior Publication Data
US 2006/0094351 A1 May 4, 2006

(51) Int. Cl.
*B64G 1/24* (2006.01)
(52) U.S. Cl. ...................................... 701/13
(58) Field of Classification Search .................... 701/13
See application file for complete search history.

(56) References Cited

U.S. PATENT DOCUMENTS

| | | | |
|---|---|---|---|
| 5,274,572 A * | 12/1993 | O'Neill et al. ................. | 702/57 |
| 5,594,454 A | 1/1997 | Devereux et al. | |
| 5,878,345 A | 3/1999 | Ray et al. | |
| 5,878,346 A | 3/1999 | Ray et al. | |
| 5,940,739 A | 8/1999 | Conrad et al. | |
| 6,052,588 A * | 4/2000 | Mo et al. ..................... | 455/430 |
| 6,078,810 A * | 6/2000 | Olds et al. ................... | 455/428 |
| 6,081,710 A * | 6/2000 | Sherman et al. ............. | 455/428 |
| 6,091,933 A * | 7/2000 | Sherman et al. ............ | 455/13.1 |
| 6,104,911 A * | 8/2000 | Diekelman ................. | 455/13.1 |
| 6,108,539 A | 8/2000 | Ray et al. | |
| 6,144,859 A | 11/2000 | LaDue | |

(Continued)

FOREIGN PATENT DOCUMENTS

JP         405183352 A       7/1993

(Continued)

OTHER PUBLICATIONS

Business Wire "Loral Skynet Granted Its First-Ever Patent for Innovative Transponder Performance Measurement System" Jul. 25, 2002, 2 pages.

(Continued)

*Primary Examiner*—Thomas Black
*Assistant Examiner*—Shelley Chen

(57) ABSTRACT

An N-Tiered enterprise and/or N-Tiered Web-based enterprise system and methods for managing, monitoring, coordinating the procedures of and optionally controlling a fleet of geosynchronous satellites through a distributed network such as the Internet. The system and associated object oriented software architecture seamlessly supports monitoring and analyzing real-time, near real-time, historical/playback, simulated and archived satellite telemetry as well as Tracking, Telemetry and Control (TT&C) ground system generated data products such as real-time alerts, archived alerts and ground system server statuses from a group of legacy distributed TT&C wide area network (WAN) ground station systems located around the world.

10 Claims, 28 Drawing Sheets

WAN (7 US/ 3 INTERNATIONAL TT&C SITES, 1 CUSTOMER WEB CENTER (CWC), 1 VIRTUAL PRIVATE NETWORK (VPN))

U.S. PATENT DOCUMENTS

| | | | |
|---|---|---|---|
| 6,154,155 A * | 11/2000 | Hershey et al. | 341/65 |
| 6,292,659 B1 * | 9/2001 | Olds et al. | 455/427 |
| 6,362,772 B1 | 3/2002 | Skotch et al. | |
| 6,463,279 B1 * | 10/2002 | Sherman et al. | 455/427 |
| 6,597,892 B1 * | 7/2003 | Caldwell et al. | 455/12.1 |
| 6,915,238 B2 * | 7/2005 | Watts et al. | 702/188 |
| 7,236,738 B2 * | 6/2007 | Settle | 455/3.01 |
| 2001/0044823 A1 | 11/2001 | LaBounty et al. | |
| 2001/0047432 A1 | 11/2001 | Zvi | |
| 2002/0023654 A1 | 2/2002 | Webb | |
| 2002/0041328 A1 | 4/2002 | LeCompte et al. | |
| 2002/0095270 A1 | 7/2002 | Watts | |
| 2003/0032426 A1 | 2/2003 | Gilbert et al. | |
| 2003/0083756 A1 | 5/2003 | Hsiung et al. | |
| 2005/0037706 A1 * | 2/2005 | Settle | 455/12.1 |
| 2006/0094351 A1 * | 5/2006 | Nowak et al. | 455/13.2 |
| 2006/0100752 A1 * | 5/2006 | Kim et al. | 701/13 |
| 2006/0240818 A1 * | 10/2006 | McCoy et al. | 455/430 |

FOREIGN PATENT DOCUMENTS

| | | |
|---|---|---|
| JP | 02003124865 A | 4/2003 |

OTHER PUBLICATIONS

U.S. Appl. No. 10/023,892, filed Dec. 21, 2001, J. Watts.

\* cited by examiner

WAN (7 US/ 3 INTERNATIONAL TT&C SITES, 1 CUSTOMER WEB CENTER (CWC), 1 VIRTUAL PRIVATE NETWORK (VPN))

Real Time Telemetry

AMC02 CWTL QLOOK     410     GMT 2003 34

| | | | | | | | |
|---|---|---|---|---|---|---|---|
| ----ATTITUDE---- | | | | | TWT 01 ARU OP | 1 | NORMAL |
| YAW | DEG | 1 | 0.000000 | | TWT 02 ARU OP | 1 | NORMAL |
| ROLL | DEG | 1 | 0.000000 | | TWT 03 ARU OP | 1 | NORMAL |
| PITCH | DEG | 1 | 0.000000 | | TWT 04 ARU OP | 1 | NORMAL |
| ATT CONVERGED | | 1 | CONVERGED | | TWT 05 ARU OP | 1 | NORMAL |
| ----ESA STATUS---- | | | | | TWT 06 ARU OP | 1 | NORMAL |
| ES IN USE | | 1 | ESA 1 | | TWT 07 ARU OP | 1 | NORMAL |
| ES ROLL | DEG | 1 | 0.178567 | | TWT 08 ARU OP | 1 | NORMAL |
| ES PITCH | DEG | 1 | 2.034631 | | TWT 09 ARU OP | 1 | NORMAL |
| ES 1 SUNPR | | 2 | | | TWT 10 ARU OP | 1 | NORMAL |
| ES 1 SS INH | | 2 | | | TWT 11 ARU OP | 1 | NORMAL |
| ES 1 NS INH | | 2 | | | TWT 12 ARU OP | 1 | NORMAL |
| ES 2 SUNPR | | 2 | | | TWT 13 ARU OP | 1 | NORMAL |
| ES 2 SS INH | | 2 | | | TWT 14 ARU OP | 1 | NORMAL |
| ES 2 NS INH | | 2 | | | TWT 15 ARU OP | 1 | NORMAL |
| ----SUN SENSOR---- | | | | | TWT 16 ARU OP | 1 | NORMAL |
| SS IN USE | | 1 | SSA 1 | | TWT 17 ARU OP | 1 | NORMAL |
| SS SUN PRES | | 1 | NO SUN | | TWT 18 ARU OP | 1 | NORMAL |
| ----CMD RECEIVERS---- | | | | | TWT 19 ARU OP | 1 | NORMAL |
| CMD RX 1 AGC | VOLT 1 | | -91.608 | | TWT 20 ARU OP | 1 | NORMAL |
| CMD RX 2 AGC | VOLT 1 | | -90.436 | | TWT 21 ARU OP | 1 | NORMAL |
| CMD RX 3 AGC | VOLT 1 | | -92.549 | | TWT 22 ARU OP | 1 | NORMAL |
| ----OBC STATUS---- | | | | | TWT 23 ARU OP | 1 | NORMAL |
| OBC 1 STAT | | 1 | ON | | TWT 24 ARU OP | 1 | NORMAL |
| OBC 2 STAT | | 1 | ON | | ----SOLAR ARRAY---- | | |
| OBC 3 STAT | | 1 | OFF | | N SA RETURN | AMPS 1 | 29.297 |
| OBC STATE | | 1 | PRIME | | N SAD STEP | | |
| OBC MODE | | 1 | 1 CNTL 2 MON | | N SAD DIR | | PRI |
| OVERLAY ID | | 1 | KALMAN TPM | | N SAD RATE | | FORWARD |
| REDMAN EN | | 1 | ENABLE | | | | NORM |
| HARDWARE SW | | 1 | ENABLE | | S SA RETURN | AMPS 1 | 29.063 |
| SAFE MODE SW | | 1 | ENABLE | | S SAD STEP | | |
| REDMAN MCR EX | | 1 | OK | | S SAD DIR | | PRI |
| MACRO STAT 1 | | 1 | ACTIVE | | S SAD RATE | | FORWARD |
| MACRO ID 1 | | 1 | 33 | | | | NORM |
| MACRO NEXT 1 | | 1 | 14 | | ----BATTERIES---- | | |
| MACRO STAT 2 | | 1 | UNDEF | | BTY 1 V | VOLT 1 | 42.000 |
| MACRO ID 2 | | 1 | 0 | | BTY 1 DIS | AMPS 1 | -1.140 |
| MACRO NEXT 2 | | 1 | 9 | | BTY 2 V | VOLT 1 | 41.440 |
| MACRO STAT 3 | | 1 | UNDEF | | BTY 2 DIS | AMPS 1 | -1.354 |
| MACRO ID 3 | | 1 | 0 | | | | |
| MACRO NEXT 3 | | 1 | 11 | | | | |
| ----TEMA STATUS---- | | | | | | | |
| TEMA EN | | 1 | ENABLE | | | | |
| ----SSPA 2,4,6,8,10,12,14---- | | | ----SSPA 16,18,20,22,24---- | 1 | ENABLE | | |
| TEMA TEST 01 EN | | 1 | ENABLE | | TEMA TEST 02 EN | 1 | ENABLE |
| TEMA TEST 01 ST | | 1 | OK | | TEMA TEST 02 ST | 1 | OK |
| | | | ----SSPA 1,3,5,7,9,11,13---- | | | | |
| | | | TEMA TEST 03 EN | 1 | ENABLE | | |
| | | | TEMA TEST 03 ST | 1 | OK | | |
| | | | ----SSPA 15,17,19,21,23---- | | | | |
| | | | TEMA TEST 04 EN | 1 | ENABLE | | |
| | | | TEMA TEST 04 ST | 1 | OK | | |
| | | | ----TWTA 2,4,6,8,10,12---- | | | | |
| | | | TEMA TEST 05 EN | 1 | ENABLE | | |
| | | | TEMA TEST 05 ST | 1 | OK | | |
| | | | ----TWTA 14,16,18,20,22,24---- | | | | |
| | | | TEMA TEST 06 EN | 1 | ENABLE | | |
| | | | TEMA TEST 06 ST | 1 | OK | | |
| | | | ----TWTA 1,3,5,9,11---- | | | | |
| | | | TEMA TEST 07 EN | 1 | ENABLE | | |
| | | | TEMA TEST 07 ST | 1 | OK | | |
| | | | ----TWTA 13,15,17,19,21,23---- | | | | |
| | | | TEMA TEST 08 EN | 1 | ENABLE | | |
| | | | TEMA TEST 08 ST | 1 | OK | | |
| | | | ----TWTA 7---- | | | | |
| | | | TEMA TEST 09 EN | 1 | ENABLE | | |
| | | | TEMA TEST 09 ST | 1 | OK | | |
| | | | ----C BAND RCVR 1---- | | | | |
| | | | TEMA TEST 10 EN | 1 | ENABLE | | |
| | | | TEMA TEST 10 ST | 1 | OK | | |
| | | | ----C BAND RCVR 2---- | | | | |
| | | | TEMA TEST 11 EN | 1 | ENABLE | | |
| | | | TEMA TEST 11 ST | 1 | OK | | |
| | | | ----K BAND RCVR 1---- | | | | |
| | | | TEMA TEST 12 EN | 1 | ENABLE | | |
| | | | TEMA TEST 12 ST | 1 | OK | | |
| | | | ----K BAND RCVR 2---- | | | | |
| | | | TEMA TEST 13 EN | 1 | ENABLE | | |
| | | | TEMA TEST 13 ST | 1 | OK | | |
| | | | ----PRU EPC 1---- | | | | |
| | | | TEMA TEST 25 EN | 1 | ENABLE | | |
| | | | TEMA TEST 25 ST | 1 | OK | | |
| | | | ----PRU EPC 2---- | | | | |
| | | | TEMA TEST 26 EN | 1 | ENABLE | | |
| | | | TEMA TEST 26 ST | 1 | OK | | |
| | | | ----TEMA 27 STATUS---- | | | | |
| | | | ----HEATERS---- | | | | |
| | | | TEMA TEST 27 EN | 1 | ENABLE | | |
| | | | TEMA TEST 27 ST | 1 | OK | | |
| | | | ----ARU STATUS---- | | | | |

FIG. 10

MULTIPLE S/C AMC ECLIPSE 009     GMT 2003 206 15:38:07

| Mnemonic/Satellite | AMC01 | AMC03 | AMC04 | AMC06 | AMC08 | AMC07 |
|---|---|---|---|---|---|---|
| N SA RETURN | 33.516 | 34.762 | 68.34637 | 46.70200 | 15.550 | 15.651 |
| S SA RETURN | 31.172 | 33.081 | 62.496 | 45.247 | 14.650 | 15.702 |
| L B VOLTS | 70.059 | 69.980 | 70.020 | 70.137 | 70.059 | 70.059 |
| BTY 1 V | 41.160 | 41.440 | 52.920 | 53.200 | 41.720 | 41.440 |
| BTY 1 RAW SOC | 105.711 | 110.000 | 146.148438 | 146.148438 | 57.05 | 57.05 |
| BTY 1 BUS CUR | -0.938 | -0.924 | -2.651 | -2.115 | | |
| BPC 1 CHG | 0.320 | 0.320 | 0.480 | 0.480 | 0.320 | 0.320 |
| BPC 3 CHG | 0.320 | 0.320 | 0.400 | 0.400 | 0.400 | 0.240 |
| BPC 5 CHG | 0.320 | 0.320 | 0.400 | 0.400 | | |
| BPC 7 CHG | 0.000 | 0.000 | 0.000 | 0.000 | | |
| BPC 1 DIS | 0.000 | 0.000 | 0.000 | 0.000 | 0.000 | 0.000 |
| BPC 3 DIS | 0.000 | 0.000 | 0.000 | 0.000 | 0.000 | 0.000 |
| BPC 5 DIS | 0.000 | 0.000 | 0.000 | 0.000 | | |
| BPC 7 DIS | 0.150 | 0.000 | 0.000 | 0.150 | | |
| BTY 1 DISCHG | 0.133 | 0.020 | 0.019533 | 0.148438 | | |
| BTY 1 CTRL PRES | 1017 | 969 | 1047 | 1059 | 924 | 883 |
| BTY 1 CTRL TMP | -4.200 | -2.500 | -3.000 | -5.20 | -5.20 | -5.20 |
| BTY 2 V | 41.720 | 41.720 | 53.200 | 53.480 | 42.000 | 41.440 |
| BTY 2 RAW SOC | 105.570 | 110.000 | 146.148438 | 146.148438 | 57.05 | 57.05 |
| BTY 2 BUS CUR | -0.703 | -1.116 | -2.407 | -1.816 | | |
| BPC 2 CHG | 0.320 | 0.320 | 0.400 | 0.480 | 0.320 | 0.240 |
| BPC 4 CHG | 0.240 | 0.320 | 0.400 | 0.400 | 0.400 | 0.160 |
| BPC 6 CHG | 0.240 | 0.240 | 0.320 | 0.400 | | |
| BPC 8 CHG | 0.000 | 0.000 | 0.000 | 0.000 | | |
| BPC 2 DIS | 0.000 | 0.000 | 0.000 | 0.000 | 0.000 | 0.000 |
| BPC 4 DIS | 0.000 | 0.000 | 0.000 | 0.000 | 0.000 | 0.000 |
| BPC 6 DIS | 0.000 | 0.000 | 0.000 | 0.000 | | |
| BPC 8 DIS | 0.150 | 0.000 | 0.000 | 0.000 | | |
| BTY 2 DISCHG | 0.113 | 0.039 | 0.148447 | 0.000000 | | |
| BTY 2 CTRL PRES | 1021 | 975 | 1029 | 1058 | 942 | 918 |
| BTY 2 CTRL TMP | -5.300 | -5.800 | -6.200 | -6.70 | -5.50 | -5.70 |
| PRU EPC 1 STAT | ON | ON | ON | ON | ON | ON |
| PRU EPC 2 STAT | ON | ON | ON | ON | ON | ON |
| PSB SIDE A STAT | ON | ON | ON | ON | ON | ON |
| PSB SIDE B STAT | OFF | OFF | OFF | OFF | OFF | OFF |

FIG. 11

Real Time Telemetry — GMT 2003 223 1

MULTIPLE S/C OUT OF LIMITS

| | Warning | | |
|---|---|---|---|
| SSPA 19 ATTEN | AMC01 | 1 | 13.0 |
| CBCN 1 STAT | AMC02 | 1 | OFF |
| CBCN 1 RNG STAT | AMC02 | 1 | OFF |
| SSPA 21 ATTEN | AMC02 | 1 | 40.0 |
| TEMA TEST 02 EN | AMC02 | 1 | DISABLE |
| TEMA TEST 10 EN | AMC03 | 1 | DISABLE |
| SSPA 04 ATTEN | AMC03 | 1 | 10.0 |
| LDA 25 FCA | AMC04 | 1 | 3.0 |

| Hazard |
|---|

| | Warning | | |
|---|---|---|---|
| LDA 16 FCA | AMC01 | 1 | 6.0 |
| CBCN 1 NML TLM | AMC02 | 1 | ON |
| CBCN 2 RNG STAT | AMC02 | 1 | ON |
| YGC CONTROL | AMC02 | 1 | FILTERED |
| TEMA TEST 03 EN | AMC02 | 1 | DISABLE |
| TEMA TEST 11 EN | AMC03 | 1 | DISABLE |
| SSPA 08 ATTEN | AMC03 | 1 | 10.0 |
| SSPA 24 ATTEN | AMC04 | 1 | 8.0 |

| Hazard |
|---|

| | Warning | | |
|---|---|---|---|
| BTY 1 CTRL PRES | AMC01 | 1 | 1045 |
| CBCN 1 AUX TLM | AMC02 | 1 | ON |
| SSPA 20 ATTEN | AMC02 | 1 | 12.0 |
| TEMA TEST 01 EN | AMC02 | 1 | DISABLE |
| TEMA TEST 04 EN | AMC02 | 1 | DISABLE |
| S/A RETURN DIFF | AMC03 | 1 | 0.47 |
| SSPA 24 ATTEN | AMC03 | 1 | 10.0 |

| Hazard |
|---|

FIG 12

TT&C Alerts

TT&C REAL TIME/ARCHIVED ALERTS                                                                                                              GMT 2003 34

| | |
|---|---|
| wbcntl 033 16:35:46 Matrix switch preset executed: 3 [AMC03_CX_PJ, 86678 | |
| wbcntl 033 16:35:46 WBCRTX1 RECEIVED 5 COMMANDS (25 GROUPS) FORAMC03 SSPA05SET(SSPA05SET_8_AMC03) 86679 | |
| vdpur12 033 16:35:49 W CMD RX 1 AGC  -100.00 >  -47.05 >  -55.00 + AMC03-1 CH012 86682 | |
| vdpur12 033 16:35:49 W CMD RX 2 AGC  -100.00 >  -53.22 >  -65.00 + AMC03-1 CH013 86684 | |
| vdpur12 033 16:35:49 W CMD RX 3 AGC  -100.00 >  -54.60 >  -65.00 + AMC03-1 CH014 86685 | |
| wbtpu08 033 16:35:49 W CMD RX 1 AGC  -100.00 >  -47.05 >  -55.00 + AMC03-1 CH012 86686 | |
| wbtpu08 033 16:35:49 W CMD RX 2 AGC  -100.00 >  -53.22 >  -65.00 + AMC03-1 CH013 86687 | |
| wbtpu08 033 16:35:49 W CMD RX 3 AGC  -100.00 >  -54.60 >  -65.00 + AMC03-1 CH014 86688 | |
| wbcntl 033 16:35:51 AMC03 20 000FF ----------SPACECRAFT CLEAR                       NVM:CMD 86689 | |
| wbcntl 033 16:35:53 AMC03 20 00000 ----------NOOP                       VER:NOP 86690 | |
| wbcntl 033 16:35:56 AMC03 20 1C113 14CE0502SSPA05 OD=ON RF=ON PWR=15.0 FCA=0.0       VER:NOP 86691 | |
| vdpur08 033 16:35:59 N STAT CHG: PR CV MSG         FRM: IDLE CMD TO: OK    AMC03-1 86694 | |
| vdpur12 033 16:36:00 N STAT CHG: PR CV MSG         FRM: IDLE CMD TO: OK    AMC03-1 86693 | |
| wbtpu08 033 16:36:00 N STAT CHG: PR CV SOURCE      FRM: STORED TO: REALTIME AMC03-1 86696 | |
| vdpur12 033 16:36:00 N STAT CHG: PR CV MSG         FRM: OK    TO: IDLE CMD AMC03-1 86697 | |
| wbtpu08 033 16:36:00 D STAT CHG: PR CV MSG         FRM: IDLE CMD TO: OK    AMC03-1 86698 | |
| wbtpu08 033 16:36:00 N STAT CHG: MON CV SOURCE     FRM: STORED TO: REALTIME AMC03-1 86708 | |
| wbtpu08 033 16:36:00 N STAT CHG: MON CV MSG        FRM: OK    TO: IDLE CMD AMC03-1 86709 | |
| wbtpu08 033 16:36:00 D STAT CHG: MON CV MSG        FRM: OK    TO: IDLE CMD AMC03-1 86709 | |
| wbcntl 033 16:36:00 AMC03 20 00000 ----------NOOP                       VER:NOP 86711 | |
| vdpur12 033 16:36:01 N STAT CHG: PR CV SOURCE      FRM: STORED TO: REALTIME AMC03-1 86701 | |
| vdpur12 033 16:36:01 D STAT CHG: PR CV MSG         FRM: OK    TO: IDLE CMD AMC03-1 86703 | |
| vdpur12 033 16:36:01 N STAT CHG: MON CV MSG        FRM: IDLE CMD TO: OK    AMC03-1 86704 | |
| vdpur12 033 16:36:01 N STAT CHG: MON CV SOURCE     FRM: STORED TO: REALTIME AMC03-1 86706 | |
| vdpur12 033 16:36:01 D STAT CHG: MON CV MSG        FRM: OK    TO: IDLE CMD AMC03-1 86707 | |
| wbcntl 033 16:36:01 WBCRTX1 IS IDLE 86713 | |
| wbcntl 033 16:36:02 AMC03 20 000FF ----------SPACECRAFT CLEAR                       NVM:CMD 86712 | |
| vdpur05 033 16:36:04 W STAT CHG: COMUX MAN PRHTR FRM: ON    TO: OFF    AMC08-1 86715 | |
| vdpur07 033 16:36:05 W STAT CHG: COMUX MAN PRHTR FRM: ON    TO: OFF    AMC08-1 86716 | |
| wvcntl 033 16:36:10 OffSiteServer lost connection to MasterServer@hlcntl 86719 | |
| whtpu08 033 16:36:29 H SSPA 05 ATTEN   2.80 >    0.00 >  16.10 - AMC03-1 102 -8 86722 | |
| vdpur12 033 16:36:30 H SSPA 05 ATTEN   2.80 >    0.00 >  16.10 - AMC03-1 102 -8 86721 | |
| wbtpu11 033 16:36:41 W STAT CHG: JET 2B PHTR OUT FRM: OFF   TO: ON    AMC05-1 SG1 86726 | |
| vdpur14 033 16:36:42 W STAT CHG: JET 2B PHTR OUT FRM: OFF   TO: ON    AMC05-1 SG1 86728 | |

FIG. 27

ANALYST DISPLAY @VVCNTL

CLEAR ALERT DISPLAY

```
vvtpu09 205 14:03:46 W CMD RX 3 AGC   -70.00 >  61.40 >  -40.50 + C1-2 CH020 1915
vvtpu13 205 14:03:46 W STAT CHG: TH ID TMED L319 FRM: TH3    TO: TH2    AMC09-1 1918
vvtpu03 205 14:03:48 H STAT CHG: N SAD DIR+SPD  FRM: FWD/NML TO: REV/SLW C1-1 1928
vvtpu03 205 14:03:48 H STAT CHG: S SAD DIR+SPD  FRM: FWD/NML TO: REV/SLW C1-1 1931
vvtpu09 205 14:03:49 H STAT CHG: N SAD DIR+SPD  FRM: FWD/NML TO: REV/SLW C1-2 1935
vvtpu09 205 14:03:49 H STAT CHG: S SAD DIR+SPD  FRM: FWD/NML TO: REV/SLW C1-2 1936
vvtpu12 205 14:03:51 W STAT CHG: SW PR LN HTR   FRM: OFF     TO: ON      AMC08-1 1944
vvtpu03 205 14:04:17 N STAT CHG: N SAD DIR+SPD  FRM: REV/SLW TO: FWD/NML C1-1 1981
vvtpu09 205 14:04:17 N STAT CHG: N SAD DIR+SPD  FRM: REV/SLW TO: FWD/NML C1-2 1989
vvtpu03 205 14:04:17 N STAT CHG: S SAD DIR+SPD  FRM: REV/SLW TO: FWD/NML C1-1 1991
vvtpu09 205 14:04:17 N STAT CHG: S SAD DIR+SPD  FRM: REV/SLW TO: FWD/NML C1-2 1992
vvtpu10 205 14:04:20 W STAT CHG: JET 7A+B PHTR O FRM: ON    TO: OFF   AMC05-1 SG1 2000
```

UNPROTECTED COMMAND LIST : AMC07    OBC: BOTH    FILE: macact49_64_amc07

```
>2003 205 11 00 21 SPACECRAFT CLEAR             SC377 (0x000FF) 10
2003 205 11 00 23 NO000                         NO000 (0x00000) +2
2003 205 11 00 25 ACTIVATE MACRO 49 OPTIONS LOOP OFF NOGO ON ERR   MACRO_ACTVT (0x173A9) 0x00310000 +2
2003 205 11 00 27 NO000                         NO000 (0x00000) +2
2003 205 11 00 28 SPACECRAFT CLEAR              SC377 (0x000FF) +1
-----END OF LIST-----
```

CLEAR PENDING COMMANDS

FIG. 28

SYSTEM AND METHOD OF PROVIDING N-TIERED ENTERPRISE/WEB-BASED MANAGEMENT, PROCEDURE COORDINATION, AND CONTROL OF A GEOSYNCHRONOUS SATELLITE FLEET

BACKGROUND OF THE INVENTION

1. Field of the Invention

The present invention relates to managing satellite operations, and more specifically to a system and method for managing and controlling the access of telemetered information from one or more spacecraft.

2. Description of the Related Art

Existing systems and architectures designed to serve the commercial satellite service provider industry have a number of drawbacks. One drawback relates to the use of unsophisticated or outdated computer technology and software applications in managing satellite services. These systems are based, for example, on a client/server paradigm which is directed to very narrow objectives. The resulting systems and software architectures thus exhibit a design parsimoniousness commensurate with the narrow scope of these objectives. They have also proven to be unsuitable for use in enterprise applications, and are generally time-consuming to implement, difficult to maintain, complex to modify, and unreliable.

Various attempts have been made to overcome these problems. Most focus on using prohibitively expensive Commercial HTTP Server, J2EE Server database management software designed to improve reliability and expand functionality. This software and other hardware-based techniques which have been attempted, however, have proven to be unsatisfactory from both a cost and effectiveness standpoint. None of the system modifications, for example, have been able to provide an enterprise-based solution that may be integrated for use on a distributed network such as the Internet.

Another drawback relates to the failure to provide an integrated satellite management scheme. Many satellite service providers use separate software systems to manage satellites that are manufactured by different spacecraft vendors. These separate systems increase costs and the overall complexity of the management process.

In view of the foregoing consideration, it is therefore apparent that there is a need for an improved system and method for managing at least one and preferably a fleet of geosynchronous satellites.

SUMMARY OF THE INVENTION

An object of the present invention is to provide an improved system and method for managing at least one and preferably a fleet of geosynchronous satellites.

Another object of the present invention is to provide a full-featured, N-tiered enterprise/web-based geosynchronous satellite monitoring and optional control system that integrates open-source resources into an object oriented architecture which serves a diverse set of internet and extranet users without the sacrificing the security of our mission critical legacy TT&C WAN ground system servers and network.

Another object of the present invention is to provide a highly secure N-tiered implementation of an enterprise application which supports geosynchronous fleet management, wherein $N \geq 2$.

Another object of the present invention is to achieve the foregoing object by providing a system architecture and software design that achieves substantial enhanced functionality while maintaining security and an unobtrusive presence within a legacy real-time mission critical distributed TT&C WAN used to control and maintain a fleet of geosynchronous satellites.

Another object of the present invention is to provide a single, unified enterprise platform that supports the management, monitoring, and optional control of a fleet of diverse geosynchronous satellites, e.g., ones produced by different commercial spacecraft manufacturers. This unified platform provides a spacecraft-agnostic attribute to the invention that gives it widespread appeal to virtually any satellite service provider and their customers.

These and other objects and advantages of the present invention are achieved by providing various embodiments of a unique system, architecture, and method which is used to make real-time, simulated, archived, and/or historical/playback telemetry data, generated from a fleet of diversified geosynchronous satellites in conjunction with an associated geographically distributed network of TT&C ground systems and related TT&C legacy servers, available on a distrubuted network (e.g., Internet) within a single integrated enterprise based application.

In accordance with one embodiment, the present invention provides an efficient and robust design, implementation, and deployment of an N-tiered software enterprise application that enables users to perform a plurality of geosynchronous satellite fleet management functions. Furthermore, the present invention achieves the aggregate sum of all the fleet management, coordination, training and optionally control requirements and objectives within an open-source-based software environment which provides users, including intranet and/or extranet users, uninterrupted access to mission critical data 24 hours around the clock. As such, the current invention provides seamless and unobtrusive integration into a complex legacy real-time TT&C WAN software architecture from a single enterprise application entry point.

One of the pre-eminent distinguishing features of this invention is it serves as a web based enterprise product integrated with an extraordinarily flexible legacy real-time TT&C WAN ground management and control system which is truly spacecraft architecture agnostic. This legacy TT&C system can handle any of the current geosynchronous spacecraft architectures including but not limited to A2100, SB2000, SB3000, SB4000, FS1300 and SATCOM series satellites. The invention can easily support any geosynchronous satellite telemetry source that follows the inventions ICD with respect to forwarding processed telemetry independent of the type of geosynchronous satellite. As extraordinary as the legacy real-time distributed WAN ground system is, what has been missing up to now is a Enterprise/web based extension to functionality supported by this premier legacy TT&C system. This invention serves to preserve the spacecraft agnostic philosophy of the existing legacy system and expand the supported TT&C services with an N-Tier enterprise/web based counterpart.

BRIEF DESCRIPTION OF THE DRAWINGS

FIG. 10 shows an exemplary eTlmTextDisplay application single spacecraft display in accordance with the present invention.

FIG. 11 shows an exemplary eTlmTextDisplay application multiple spacecraft text display in accordance with the present invention.

FIG. 12 shows an exemplary eTlmTextDisplay application "Out Of Limit" text display in accordance with the present invention.

FIG. 27 shows an exemplary eTlmAlertDisplay application archived version of the invention's alert display in accordance with the present invention.

FIG. 28 shows an exemplary eTlImAnalystDisplay application composite alert and pending command text display in accordance with the present invention.

DESCRIPTION OF THE PREFERRED EMBODIMENTS

Figure 1:
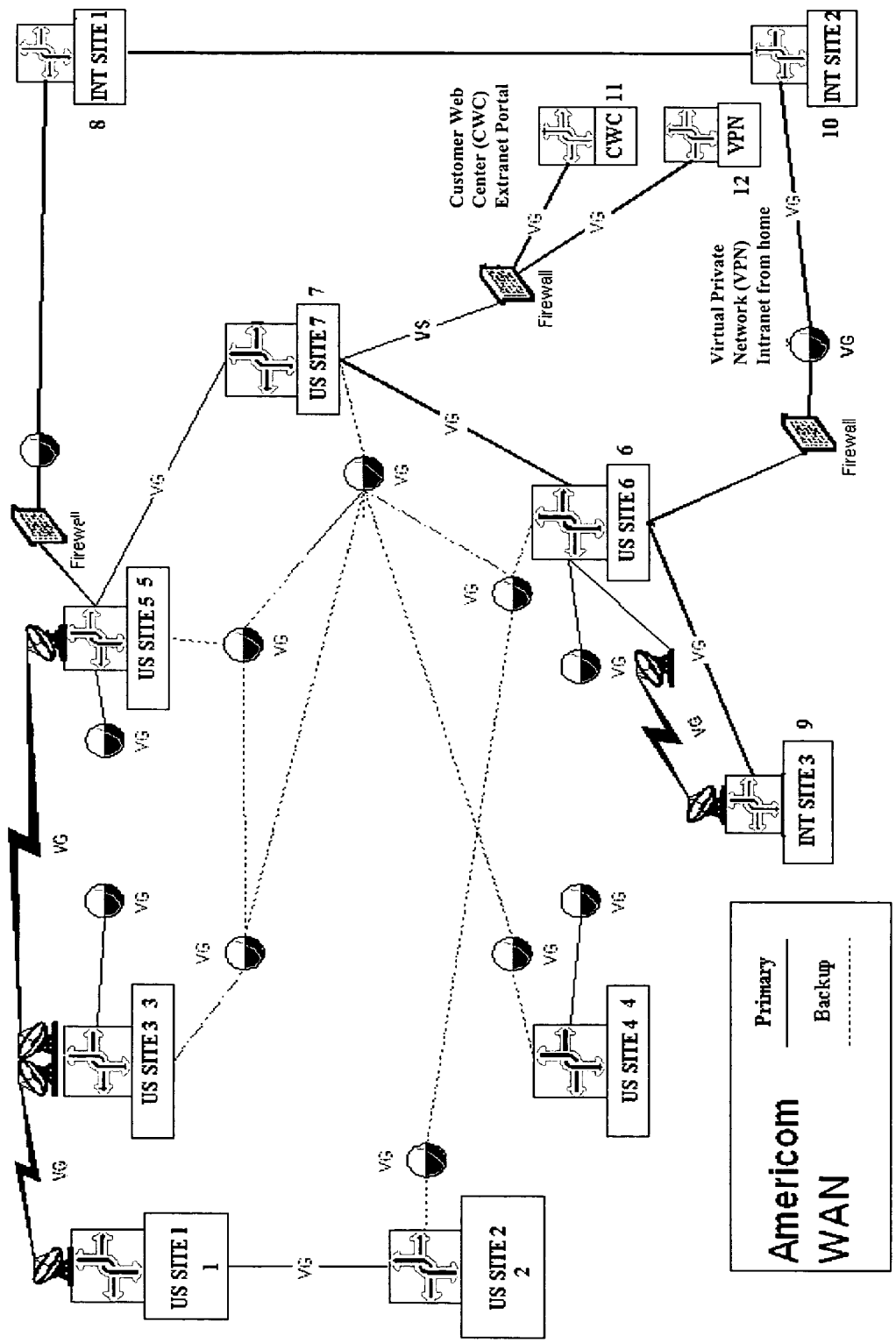
FIG. 1 is a diagram showing a Wide Area Network (WAN) servicing an N-Tier Enterprise/web-based geosynchronous satellite fleet management, monitoring, coordinating and optional controlling system in accordance with a preferred embodiment of the present invention. For illustrative purposes, the WAN is shown as including a configuration of 6 US TT&C sites, 3 international TT&C sites, 1 customer web center (CWC) and Virtual Private Network (VPN). Other configurations are possible, however.

The present invention is a system and method for performing N-tiered enterprise/Web-based geosynchronous satellite fleet management, procedure coordination, monitoring, and optional control operated using at least in part a distributed network such as but not limited to the Internet. The system and associated object-oriented software architecture seamlessly supports monitoring and analyzing real-time, near-real-time, historical playback, simulated and archived satellite telemetry, as well as Tracking, Telemetry and Control (TT&C) ground system generated data products including real-time alerts, archived alerts and ground system server statuses from a group of legacy distributed TT&C wide area network (WAN) ground station systems located around the world or in a more limited geographical area. The system may also support coordination and optional control of real-time fleet satellite procedures and anomaly intervention events.

The multi-tiered architecture preferably includes an expandable configuration of two web servers, a single portal based extranet web server, and an application web server. If desired, this deployment may be expanded to allow the application to concurrently support intranet users and/or extranet users who require, for example, access to real-time, simulated, archived and historical telemetry.

The system may also support a number of diversified user requirements including but not limited to all or a portion of the following: external leased transponder customers monitoring leased transponder performance; external users monitoring single or multiple spacecraft; internal analysts and controllers performing daily fleet management and monitoring responsibilities; internal spacecraft engineers performing fleet maintenance and anomaly intervention activities; external spacecraft vendors and fleet support teams monitoring real-time satellite performance; internal management activities required to coordinate both internal and external fleet monitoring and control activities; and internal sales based leased transponder customer related activities. The aforementioned requirements may be achieved and implemented using the unique system design and architecture provided in accordance with the present invention.

To avoid expensive enterprise software licenses, the N-Tiered architecture integrates a myriad of premium open-source software application products. These products include, for example, Apache, Tomcat, MySql and Jboss. Other or additional software products may be integrated into the architecture of the present invention id desired.

The unique system software and architecture of the present invention may be adapted to support any manufactured geosynchronous satellite and is not limited to the current fleet of A2100, SB2000, SB3000, SB4000, LS1300 and LM Series 3000/4000 satellites.

This adaptability makes the various embodiments of the invention a truly spacecraft-architecture agnostic unified enterprise based application. The invention may also be implemented to provide 24×7 mission critical availability for virtually any satellite configuration, one example of which includes a fleet of 16 geosynchronous satellites with associated 32 streams of real-time telemetry frames processed over a predetermined time interval (e.g., every .5 seconds). While application to this fleet is desirable, the system and method of the present invention may be implemented to provide mission critical support and availability to other types of satellite networks.

None of the existing systems provide a single, unified enterprise platform that supports the management, monitoring, and optional control of a fleet of diverse geosynchronous satellites produced by different commercial spacecraft manufacturers. This unified application is needed to achieve a spacecraft agnostic attribute by supporting all commercial geosynchronous satellite architectures.

FIG. 1 shows a system for performing N-tiered enterprise/Web-based geosynchronous satellite fleet management, procedure coordination, monitoring, and optional control operated using a distributed network in accordance with one embodiment of the present invention. The system includes a corporate enterprise wide area network (WAN) composed of an aggregate of legacy TT&C local area networks (LANs) comprised of an full compliment of legacy mission critical real-time TT&C application servers dedicated to the functions associated with the day to day tasks of monitoring and controlling a fleet of geosynchronous satellites and the distributed ground system application servers associated with all TT&C related functionality. The system supports extranet access through a corporate external portal referred to in FIG. 1 as the Customer Web Center (CWC) 11 as well as off-site intranet access through the corporate Virtual Private Network (VPN) 12. FIG. 1 also shows the enterprise WAN where the N-tiered enterprise/Web-based geosynchronous invention is deployed.

Figure 2:
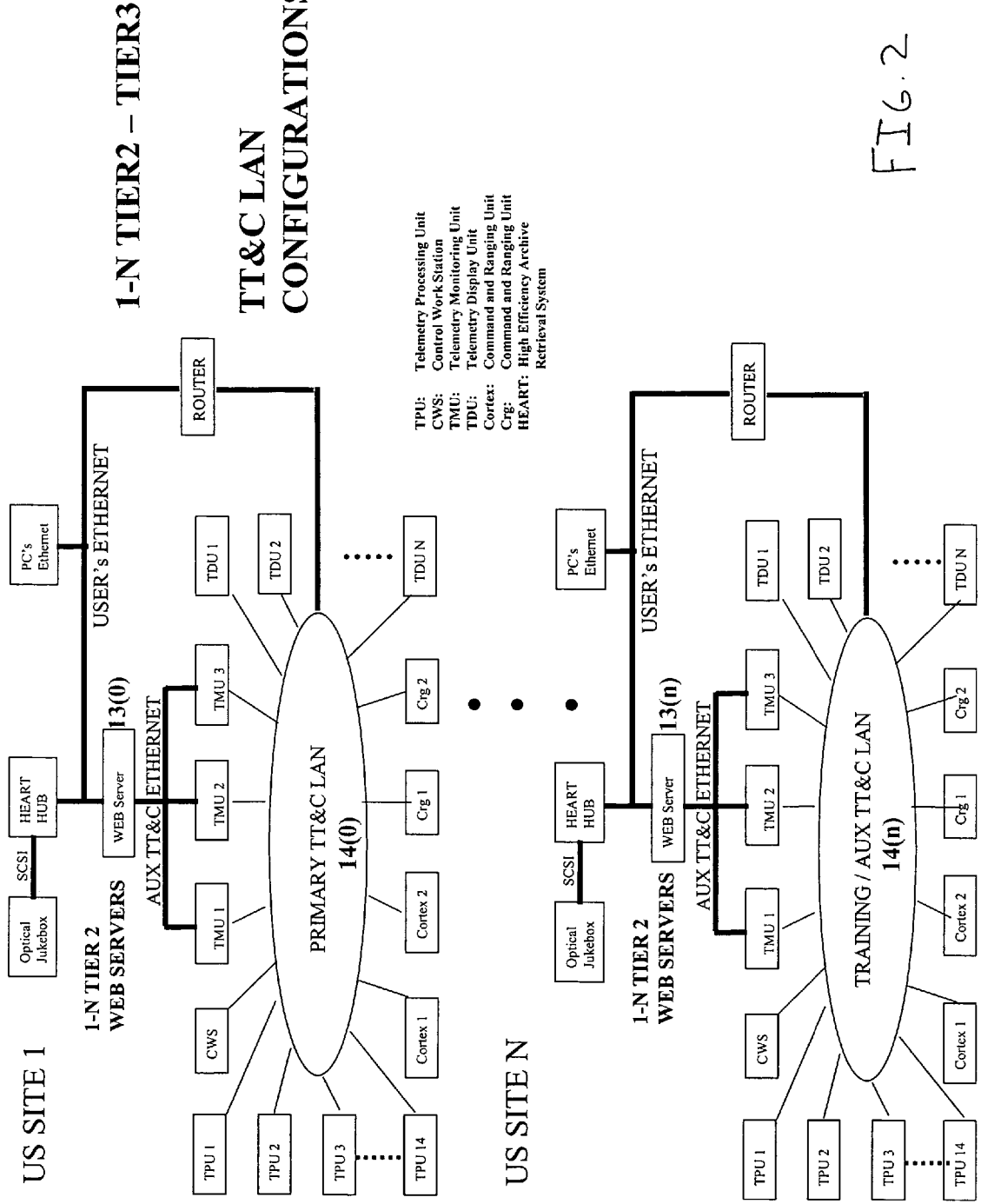
FIG. 2 is a diagram showing example configurations of the 1-N TIER 2 to TIER 3 TT&C LAN.

FIG. 2 shows the collection of legacy TT&C LANs that supports this invention's Web based middle tier (TIER 2) WEB Server. The main contribution of invention's WEB based tier 2 Web Server system architecture and software is to provide corporate enterprise intranet and extranet access to TT&C data products without introducing excessive client loading or unsecured client access to the existing legacy TT&C mission critical application servers.

Figure 3:
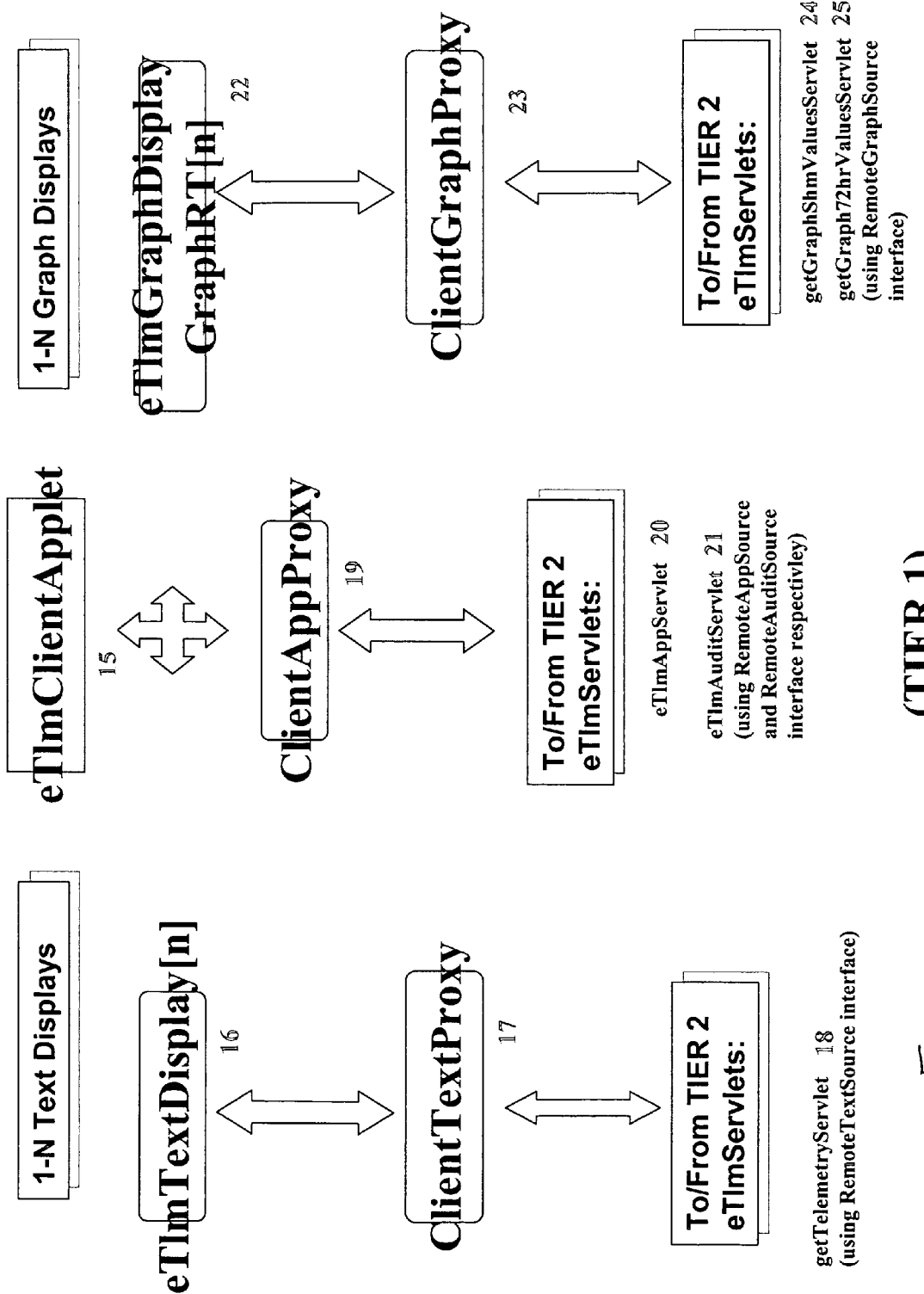
FIG. 3 is a diagram showing one portion of the TIER 1 (e.g., Applet/Presentation Layer) software modules and associated architecture which may be included in the system of the present invention.

FIGS. 2 and 3 are diagrammatic portrayals of different portions of a Tier 1 architecture in accordance with the present invention. This architecture includes an eTlmClientApplet 15 that preferably runs in a user's local web browser. More specifically, the Tier 1 diagrams characterize the functional and distributed transactional attributes of the Tier 1 architecture of the present invention.

The functional attributes include the components that provide end users with a wide array of display formats including graph displays, text displays, archived data graph displays, and archived data report files which are generated from real-time telemetry, archived telemetry, simulated telemetry, historical telemetry, and/or TT&C ground system data sources.

The entire set of eTlmClientApplet 15 functions, which make up the graphical user interface of the enterprise application, may complete the list of TIER 1 functional attributes or additional functions may be included as desired.

The distributed transactional attributes include a robust multi-tiered system of communication channels that preferably operate in the background in order to generate the functional outputs with a speed, reliability, and security sufficient to serve a heterogeneous group of enterprise users in a stable and secure fashion. One or more software modules support the transactional attributes. These modules preferably include a comprehensive suite of HTTP/HTTPS-based applet-to-servlet communication modules, JAVA-based RMI communication modules, enhanced JAVA-based RMI communication modules, JAVA-based generic TCP/IP communication modules, and C-based TCP/IP socket communications modules. These elaborate sets of communication modules anticipate any evolution or alternative embodiment that may be proposed for an enterprise-based application.

The functional attributes are event-driven outcomes represented in FIGS. 2 and 3 as parent nodes, which are located directly under the eTlmClientApplet 15 grandparent node. The parent nodes are labeled eTlmTextDispay 16, eTlmGraphDisplay 22, eTlmAlertDisplay 26, eTlmAnalystDisplay 34, and eTlmAdDisplay 29 and are all subordinate to the eTlmClientApplet 15 node. These nodes represent supported application displays and a graphical user interface contributing to exemplary functional outputs of the application.

The subordinate nodes of the parent nodes in the Tier 1 diagrams represent the distributed transactional attributes associated with Tier 1 of the invention. The nodes are represented in levels 3 and 4 of the Tier 1 diagrams. The transactional representations in these diagrams correspond to the communication channels supporting information and data exchange between Tier 1 and Tier 2. In general, information exchange starts with the various client proxy communication modules and ends with their respective eTlmServlet executions on Tier 2.

Functionally, the eTlmClientApplet 15 presents users with the applications graphical user interface. The graphical user interface provides a plurality of options to users in the form of application panels and application panel components. Application panels supported by the eThnAppletClient 15 include a text panel, a real-time graph panel, an alert and analyst panel, and an archived data panel. Each panel supports all the user specification options for the various system sub-applications.

The diagrammatic flow in FIGS. 2 and 3 will now be discussed. The label "eTlmClientApplet" 15 appears at the center of the Tier 1 diagrams to represent the invention's application applet, which runs within any commercial Internet browser. Each of the four applet panels, labeled TEXT, GRAPH, ALERTS & ANALYSTS and ARCHIVED DATA, serve to support the user supplied specifications needed to initiate one or more of the transactional communication channels designed to facilitate transactional data exchanges between Tier 1 and Tier 2. The data exchanges are designed to achieve a specified Tier 1 functional outcome.

Communication within this architecture takes on various forms. Some communication channels support single updates to an enterprise applet/GUI menu. Other communications facilitate a continuous stream of updates, as a function of the time, required by the real-time text and graph displays. Still other communication channels serve users requesting archived data stored on either Tier 2 or Tier 3. This allows users to monitor the status of the outstanding requests and enables them to retrieve and/or display the resultant archived data products.

As previously mentioned, the Tier 1 diagrams are organized as a function of Tier 1 outputs. The Tier 1 outputs and their associated Tier 1-to-Tier 2 communication links which make up the branches in the TIER 1 diagrams are labeled separately as follows: 1-N Text Displays, 1-N Archived Data Displays, 1-N Graph Displays, 1-N Alert Displays, and 1-N Analyst Displays. In the Figures, "1-N" is used to convey the fact that the application supports numerous instances of the various display formats within a single application session. The data output from the communication channel dedicated and designed for updating the GUI applet is not depicted in the diagrams. Furthermore, the previously mentioned branches are composed of the client proxy communication links designed to communicate with TIER 2 servlets.

Each of the communication channels supporting the various application functions begins with a client proxy communication, which marshals a request data Object and sends the appropriate request data object to the appropriate servlet located on Tier 2.

This customized client proxy security mechanism is preferably used in this embodiment of the present invention in order to strictly insure that all communications between the application applet on Tier 1 and servers located on Tier 2 are directed through port 80 using either HTTP or HTTPS protocols in conjunction with the Tier 2 Tomcat servlet container. To illustrate how the application implements this, a discussion of a typical data exchange sequence involving the clientAppProxy 19, eTlmAppServlet 20, and the Tier 2 eTlmAppServer 43 which implements a RemoteAppSource 44 interface follows.

The clientAppProxy 19 module extends the applications BaseProxy class. The BaseProxy serves to open up the object input and output streams required to support communications with the Tier 2 servlets and define the class method, invokeServlet ( ), which may serve as the primary communication function call used in all applet-to-servlet communications. Since network security is important, in order not to compromise security the BaseProxy/clientAppProxy modules guarantee that external and internal users use port 80 exclusively with either HTTP or HTTPS protocols.

For example, the clientTextProxy 17 may communicate directly with a servlet on an application web server. The Tomcat servlet container supports a server-side mechanism for responding to HTTP requests using the servlet container's defined HttpServletRequest and HttpServletResponse communication function calls. The servlet on the server side then performs as the applet client's "proxy" and executes the JAVA-based remote method invocation (RMI) call on the server.

The servlet responds to the client with the results generated by the RMI server. Essentially, the applet executes methods on the servlet proxy object using HTTP instead of executing a direct communication call to the RMI server. From the perspective of the users and the firewall, all communications are transacting over port 80 and network security is maintained. Without this precaution, the multi-faceted set of TCP/IP communications required between the applet running on an end user browser and the N-Tier enterprise network of servers of the present invention would require severe violations to the internal corporate network security model and make the implementation unviable for enterprise use.

The HTTP tunneling mechanism described above is strictly adhered to with all the applications client proxy objects. As a natural extension of this approach, all Tier 1 client proxy objects are supported on Tier 2 with a corresponding servlet.

In addition, the Tier 1 diagrams show a number of multi-threaded thread pools designed to support the various session output displays for any given application session. In accordance with a preferred embodiment, the application integrates five different sets of session thread pools, one for each of the following display types used by the application: eTlmTextDisplay 16, eThnGraphDisplay/GraphRT 22, eTlmAlertDisplay 26, eTlmAdDisplay 29, and eTlmAnalystDisplay 34.

These thread pools are implemented as object arrays and are preferable for purposes of managing the multi-thread scheme the present invention uses to support the contemporaneous updates to all session displays. These thread pools are customized based on the individual attributes of the various types of displays supported by the present invention. Within a given session, the users are not allowed to exceed the maximum threads allocated for the various display pool groups. However, a user may free up and reuse allocated threads using thread managing methods designed for each of the respective pool/display types.

Figure 5:
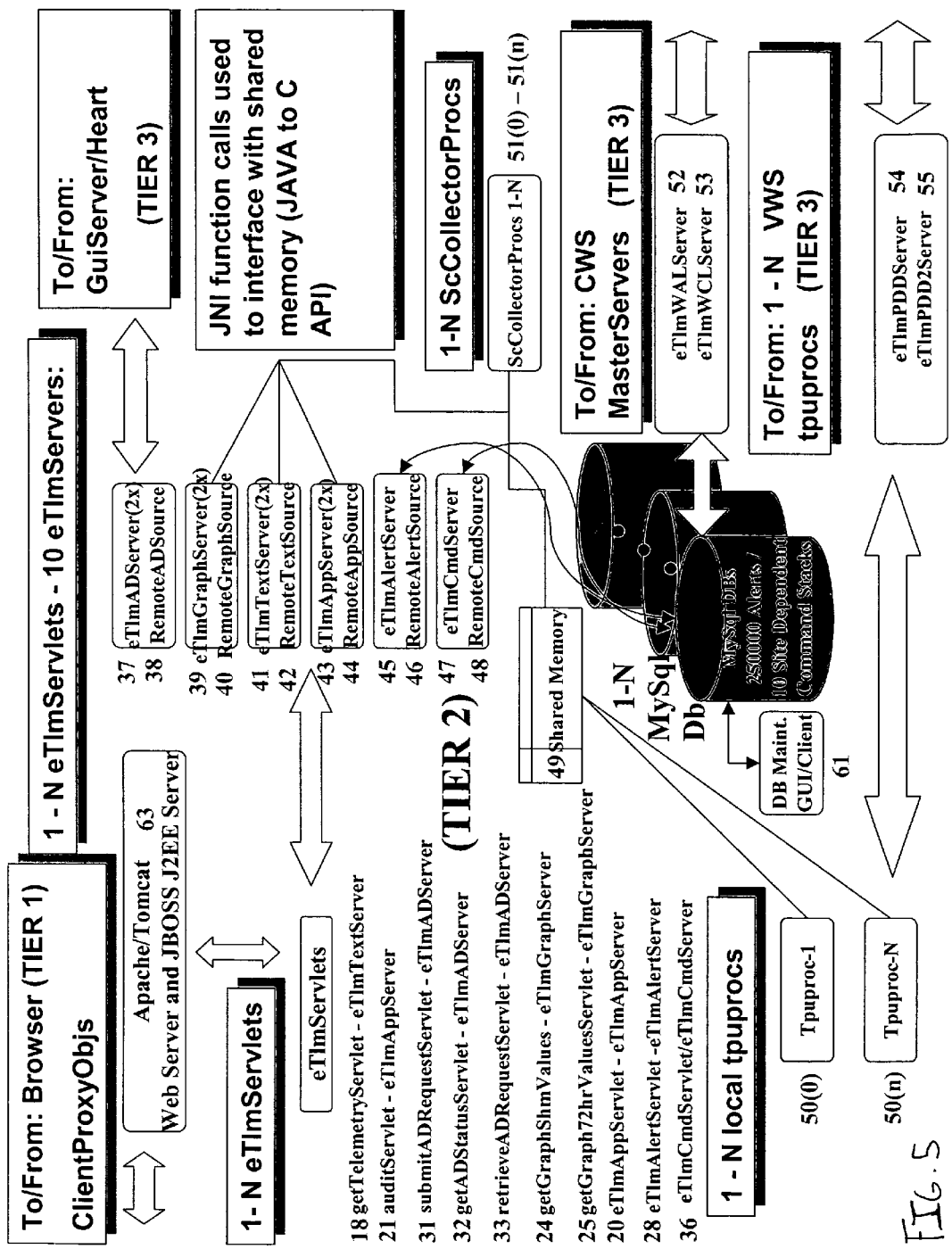
FIG. 5 is a diagram showing one portion of the TIER 2 (Middle-Layer) software modules and associated architecture in accordance with the present invention.

An example of the foregoing may be provided with reference to FIG. 5. Starting with the default TEXT panel shown in this figure, the Tier 1 architecture for supporting text displays includes the following modules: eTlmClientApplet 15, eTlmTextPanel, clientAppProxy 19, clientTextProxy 17, and eTlmTextDisplay 16. In addition to these modules, a customized suite of data objects designed to be distributed between the TIER 1 applet and the Tier 2 RMI servers are instantiated as input and output objects supporting either the RemoteAppSource 44 or RemoteTextSource 42 interface module/classes.

For illustrative purposes, each module includes all the JAVA classes and subclasses needed to support the desired functionality of the application. JAVA is preferable because of the language's object-oriented attributes concurrent with its platform-independent implementation. This allows the invention to achieve software reuse associated with an object-oriented design and at the same time takes advantage of a flexible implementation that can be deployed on any web application server (UNIX or MS Windows). The operative caveat of course is that invention is not limited to a JAVA implementation. The invention can easily be implemented using any known programming language.

Returning to the TEXT Panel example, the TIER 1 diagrams establish that the primary communication channel supporting all session GUI functions is comprised of the clientAppProxy 19—eTlmAppServlet 20 (using the RemoteAppSource 44 interface modules designed methods) communication link. While the transactional channel supporting the eTlmTextDisplay 16 functionality is comprised of the clientTextProxy 17—getTelemetryServlet 18 communication channel using RemoteTextSource 42 interface methods. More will be explained about the various Remote interface methods required by each of the Tier 2 RMI servers in the discussions that follow. For now, it is sufficient to understand that the class methods defined for the ClientAppProxy 19 class are exactly the same as the methods defined in the eTlmAppServlet 20 on Tier 2 and the Tier 2 RemoteAppSource 44 interface which the eTlmAppServer 43 implements. For instance, the ClientAppProxy 19 may contain the following methods in its class definition: getSatellites( ), getCustomer( ), getPatFileData( ), and getMnemonics( ). Examining the class methods defined by the eTlmAppServlet 20 module would expose the exact same sets of methods as ClientAppProxy 19 and a similar finding would hold true for RemotAppSource 44 defined interface as well.

Putting these components together and based on the aforementioned HTTP tunneling explanation above, one can now trace through a typical eTlmClientApplet 15 communication sequence supporting all text panel transactions. The applet preferably includes a constant stream of Tier 2 updates based on the TEXT panel specification options presented by the GUI. Selecting from the various GUI specification options, users invoke the appropriate clientAppProxy 19 method, which in turn invokes the appropriate Tier 2 servlet's method using an HTTPServletRequest communication method. The servlet, in turn, invokes the appropriate RMI server method, which will return a customized data object or array of objects as defined by the eTlmAppServer's 43 implementation of the RemoteAppSource 44 interface. The returned data object being sent to the servlet following the servlets invocation of the RMI server function will get written to the client's eTimAppletClient 15 by the servlet's doPostwriteObject sequence. For those tasked with preserving the security of a mission critical TT&C WAN, this is an advantageous features of the invention without which enterprise communications may be fraught with risk.

As users complete the specifications resident in the default Text Panel, they will initiate a session text display by selecting the display button option at the base of the TEXT panel. The eTlmClientApplet 15 graphical user interface object will host an array of text display threads specially tailored and engineered to pop-up a frame with the specified text display information. Each session preferably hosts a maximum number (e.g., 5) text displays at a time. Users are free to terminate an existing display and launch another display and as long as the user does not exceed the total maximum allowed active display threads per session for a given display type. The thread pool supporting other invention-type dependent display pools are totally separate.

Updates are provided for all the active eTlmTextDisplay 16 threads using the same HTTP tunneling mechanism described above. The update interval for intranet-supported text displays is periodic (e.g., every 2-3 seconds), while the extranet update interval rate is at a different rate (e.g., about once every 5-6 seconds). As can be seen, the intranet embodiment of the present invention is more responsive (e.g., about twice as responsive as the extranet counterpart using the aforementioned exemplary values). In the case of text display updates, the Tier 1 modules involved are the clientTextProxy 17 and its associated getTelemetryServlet 18 using RemoteTextSource 42 interface methods. The methods associated with the clientTextProxy 17 are as follows: getTelemetry( ), stopTelemetry( ), and expandMnemonics( ).

As was the case for clientAppProxy 19, the methods defined for the getTelemetryServlet 18 and the RemoteTextSource 42 interface mirror those of the clientTextProxy 17 class. Since the information required to update the text displays can be rather extensive, requiring an update of up to 150 parameters every two seconds, the data exchange object supporting updates may be optimally designed to handle data updates exclusively.

Figure 6:
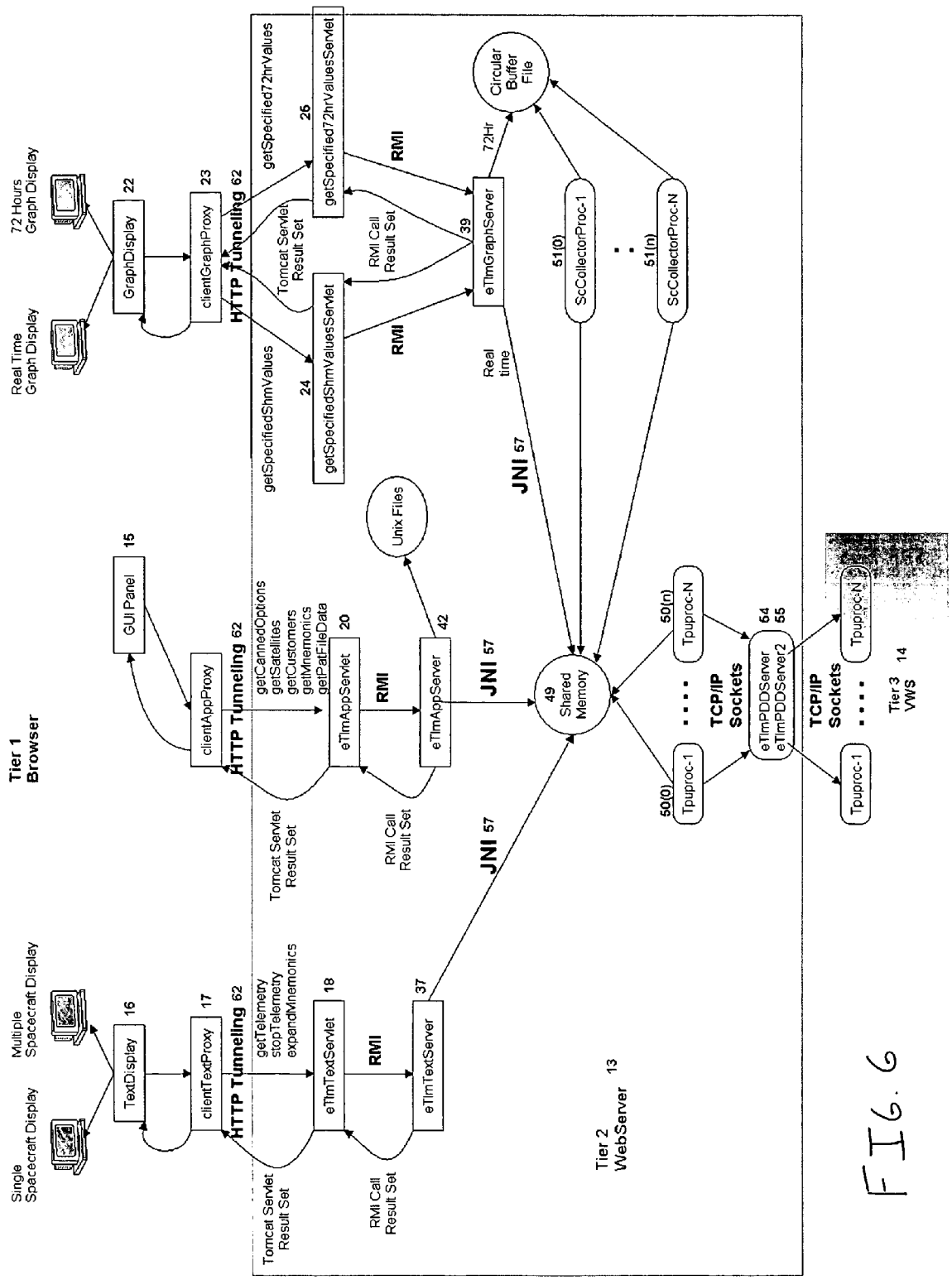
FIG. 6 is a diagram showing a transactional flow of the TT&C data products from TIER 1 data requests from the application to return of TT&C data product resultant set from TIER 2/TIER 3 back to TIER 1.
Figure 7:
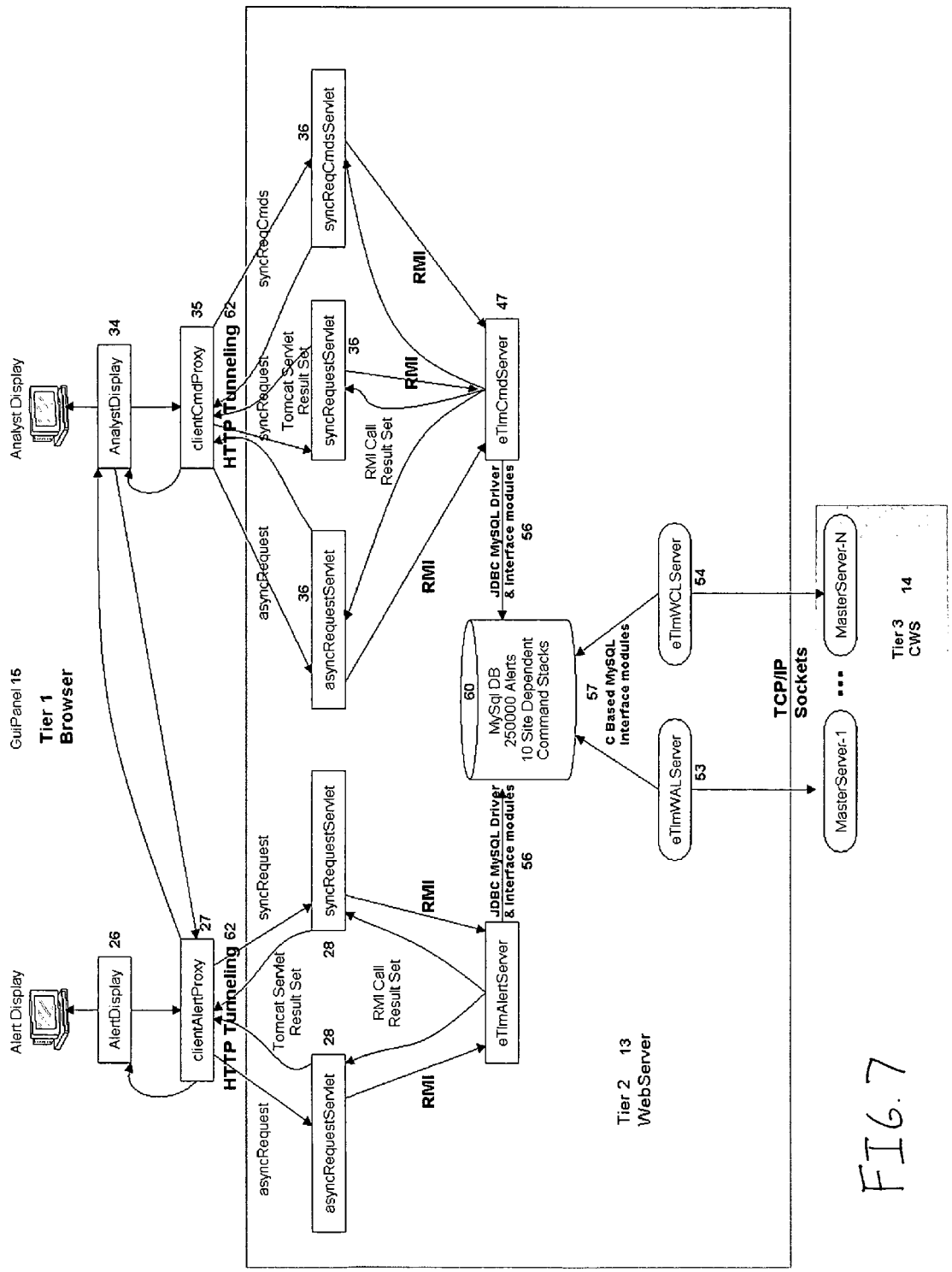
FIG. 7 is a diagram showing an additional aspect of the transactional flow of the TT&C data products from TIER 1 data requests from the application to return of TT&C data product resultant set from TIER 2/TIER 3 back to TIER 1.

Switching the perspective of the discussion from the transactional attributes to the functional attributes of the system, the type of data supported by the clientTextProxy 17/getTelemetryServlet 18 communication channel is sufficiently diversified to handle the multiple text display formats supported by the TEXT panel graphical user interface (See FIG. 5). Users can as a function of sc option menu selection initialize both single and multiple text display formats exemplified by FIGS. 6 and 7 respectively.

Users have the ability to select from a comprehensive collection of pre-configured text display options supported by the application for each spacecraft. These preconfigured text display specifications preferably mirror the exact displays supported by the legacy real-time TT&C telemetry monitoring system used by spacecraft engineers, analysts, and controllers at each of the remote TT&C site locations. In addition, the users may specify multiple spacecraft and rtm combinations and view displays based on the subset of pre-configured options supported for multiple spacecraft telemetry viewing.

Figure 8:
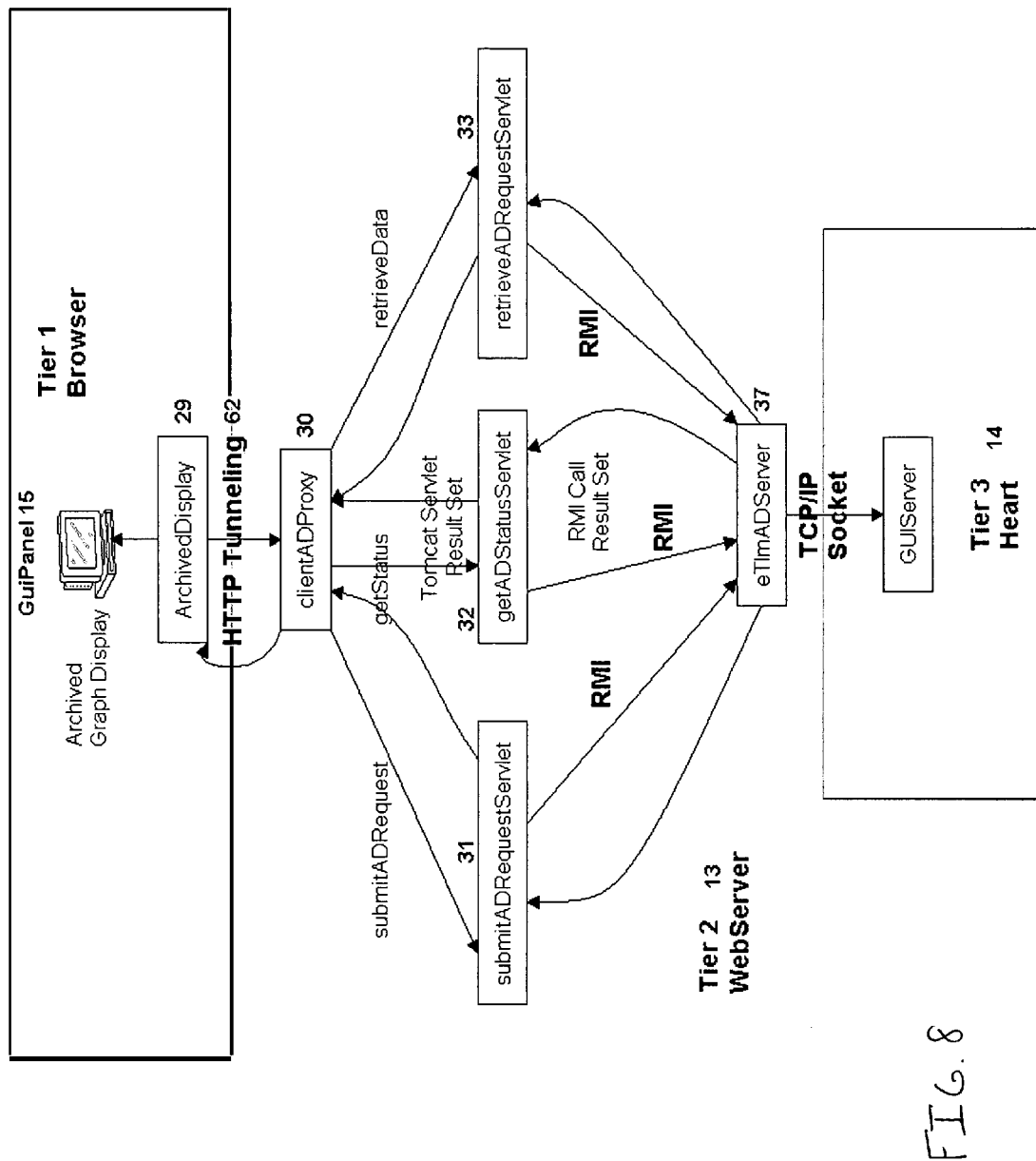
FIG. 8 is a diagram showing an additional aspect of the transactional flow of the TT&C data products from TIER 1 data requests from the application to return of TT&C data product resultant set from TIER 2/TIER 3 back to TIER 1.

Another multiple spacecraft text display option supported by the TEXT panel with the associated clientTextProxy 17 and RemoteTextSouce 42 modules is the "Out Of Limit" display shown in FIG. 8. The "Out Of Limit" display summarizes one or more out-of-limit telemetry points for all the spacecraft/rtm combinations specified when the user launches the display.

In accordance with the preferred embodiment, three formats of out-of-limit displays are supported by the application: Hazard, Warning, and Both. Based on user specifications, a display will be initialized containing either all telemetry parameters currently in a hazardous state or all telemetry parameter currently in a warning state for the spacecraft/rtm combinations of interest. Moreover, users can opt to see all the current hazardous and warning parameters within a single page by specifying "out-of-limit both." For convenience purposes, telemetry in these displays may be color coded as a function of spacecraft/rtm and out-of- limit state.

Figure 9:
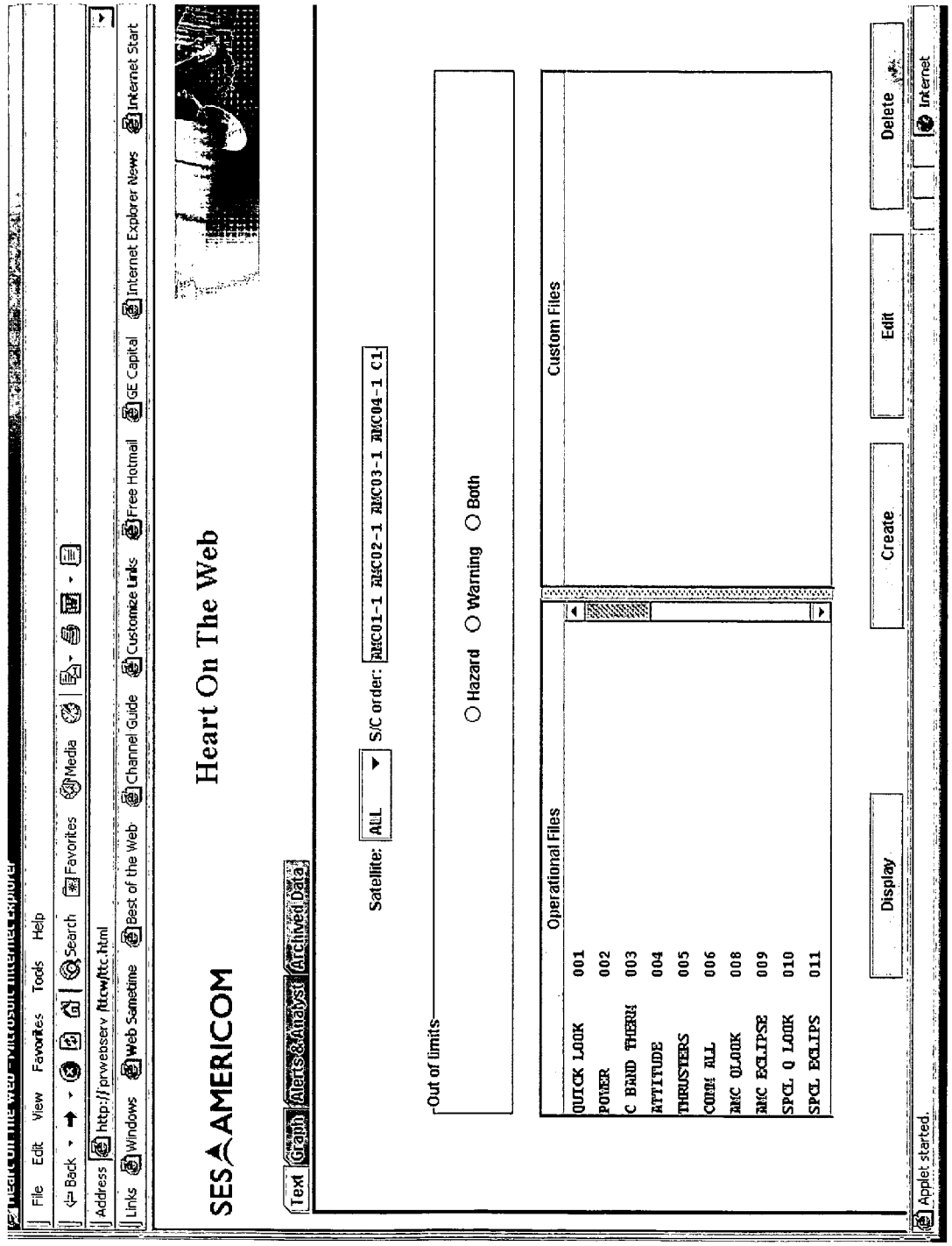
FIG. 9 shows an exemplary application applet presentation of an eTlmClientApplet's text panel in accordance with the present invention.

Users are not restricted to view telemetry from the pre-configured options. The application may, for example, provide a mechanism to dynamically configure a user-defined text display format by selecting a CREATE option at the base of the TEXT panel. The application responds by presenting a CREATE setup subordinate menu shown, for example, in FIG. 9. This may be in the form of a three-column spreadsheet-like menu, which mirrors the three-column format of the eTlmTextDisplay 16 in the single spacecraft mode of operation.

Upon placing the mouse in any of the spreadsheet-like menu cells, a pop-up menu containing all the mnemonics for the given spacecraft is summoned to the foreground of the application applet. User can then select from any of as many as 10,000 mnemonics and populate the row/column spread sheet cells with any mnemonics they wish. Users finished with the creation of the customized text display specification may be prompted for the name of the new text display option. A user may then highlight the new option from the customized file configuration list presented in the TEXT panel and initialize an eTlmTextDisplay 16 from this configuration instead of the pre-configured options.

The previous sequence supported within the CREATE subordinate setup menu preferably utilizes the communication scheme described above between or among the clientAppProxy 19, eTlmAppServlet 20, and RemoteAppSource 44 modules, which are engineered to support communications with the Tier 2 eTlmAppServer 43 to retrieve the list of mnemonics associated with the specified spacecraft provided by the user.

The next panel option available within the eTlmClientApplet 15 is the GRAPH panel is shown in FIG. 10. The GraphicalSetupMenu module within the eTlmClientApplet 15 supports the GRAPH panel. As shown in FIG. 2, the eTlmGraphDisplay 22, clientAppProxy 19, clientGraphProxy 23, getGraphShmValuesServlet 24 and RemoteGraphSource 40 modules support real-time graphs.

Similar to the client proxy scheme supported for Tier 1-to-tier communications for the eTlmTextDisplay 16 operations, a customized proxy scheme implementation is preferably performed to support the eTlmGraphDisplays 22. The GraphicalSetupMenu communicates with the eTlmAppServer 43 via the clientAppProxy 19 to populate all pre-configured graphical display lists associated with the spacecraft selection option menu. Should users highlight any of the pre-configured options dedicated to a given spacecraft, a table at the top of the display may be populated with the appropriate SC/RTM, MNEMONIC, MTN and MAX table cell information provided by the cientAppProxy.

Users have the option to use information directly from the table or alter any of the table cells dynamically. Should the users change either the SC/RTM or MNEMONIC table cells, the changes will be based on data provided to the applet via the clientAppProxy 19 communication channel. SC/RTM changes will launch a clientAppProxy 19 method to retrieve all the mnemonics associated with the new SC/RTM combination specified. User proceeding with MNEMONIC changes will be provided the correct alphabetically ordered list of mnemonics associated with the SC/RTM specification as shown, for example, in FIG. 11. Alterations to the specifications of MIN/MAX cell information are preferably reflected in the graph display only. Users can select a subset of the table items to be displayed and specify from a list of pre-configured time scale options.

Figure 13:
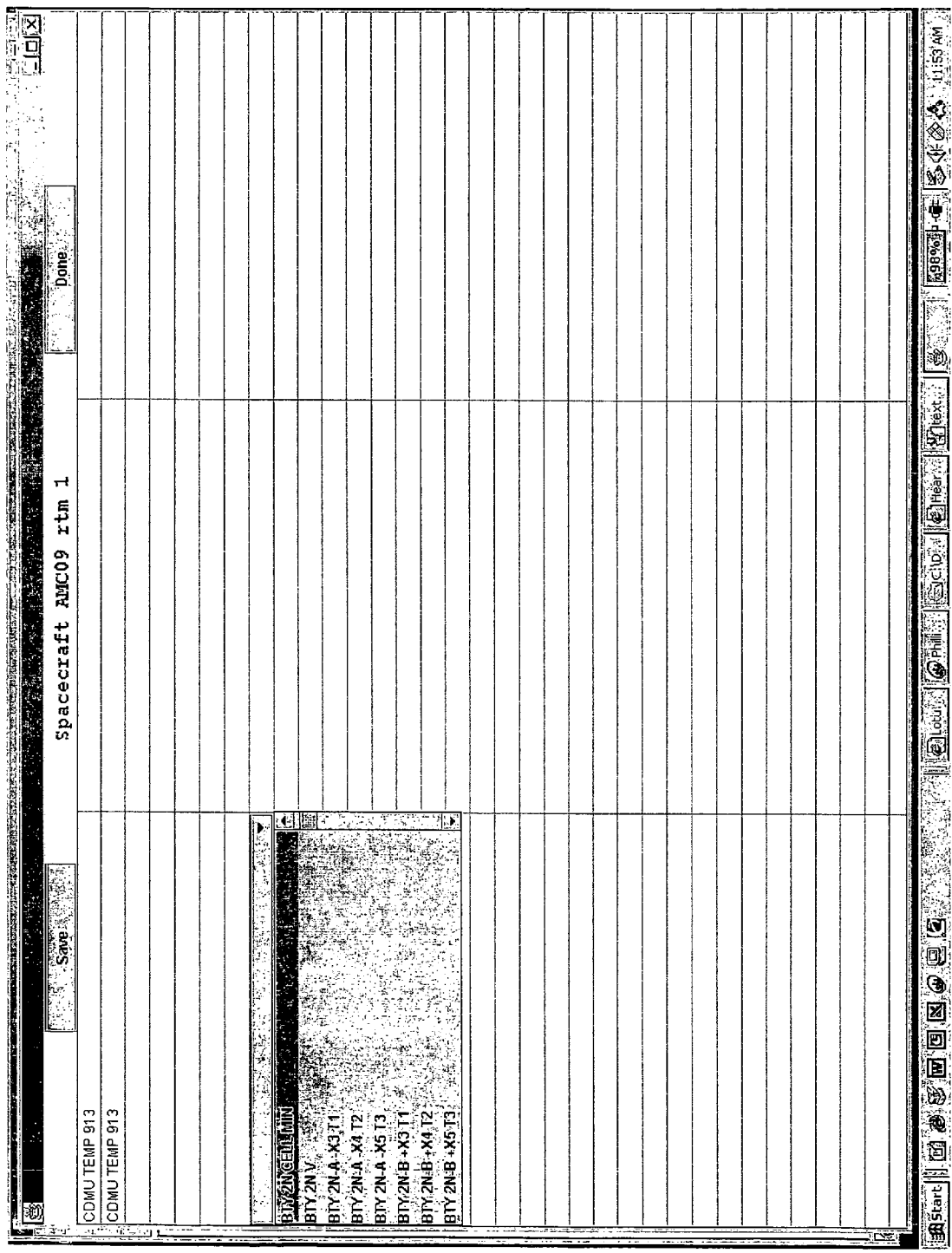
FIG. 13 shows an exemplary CREATE subordinate application panel display in accordance with the present invention.
Figure 14:
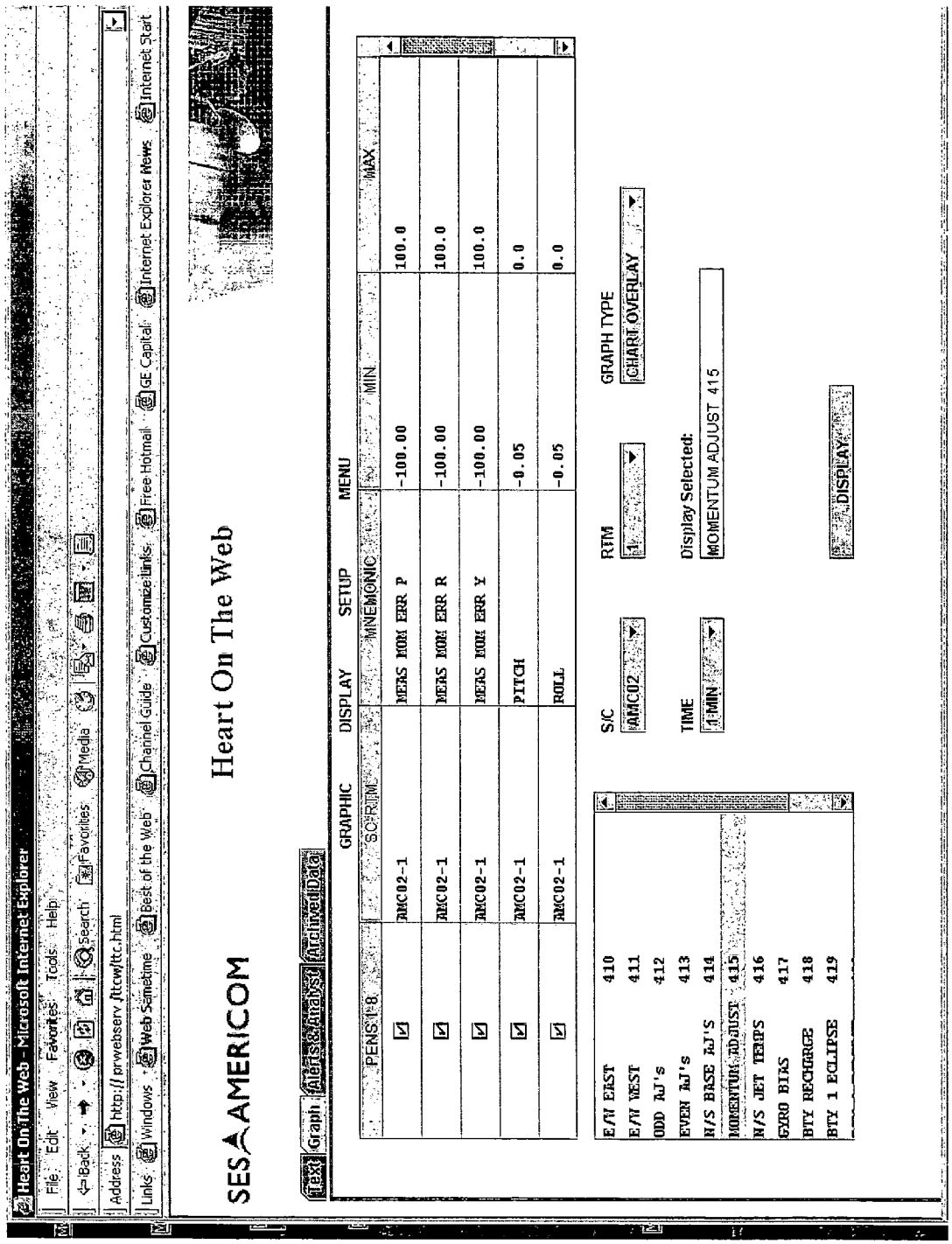
FIG. 14 shows an exemplary presentation of the eTlmClientApplet's graph panel in accordance with the present invention.
Figure 15:
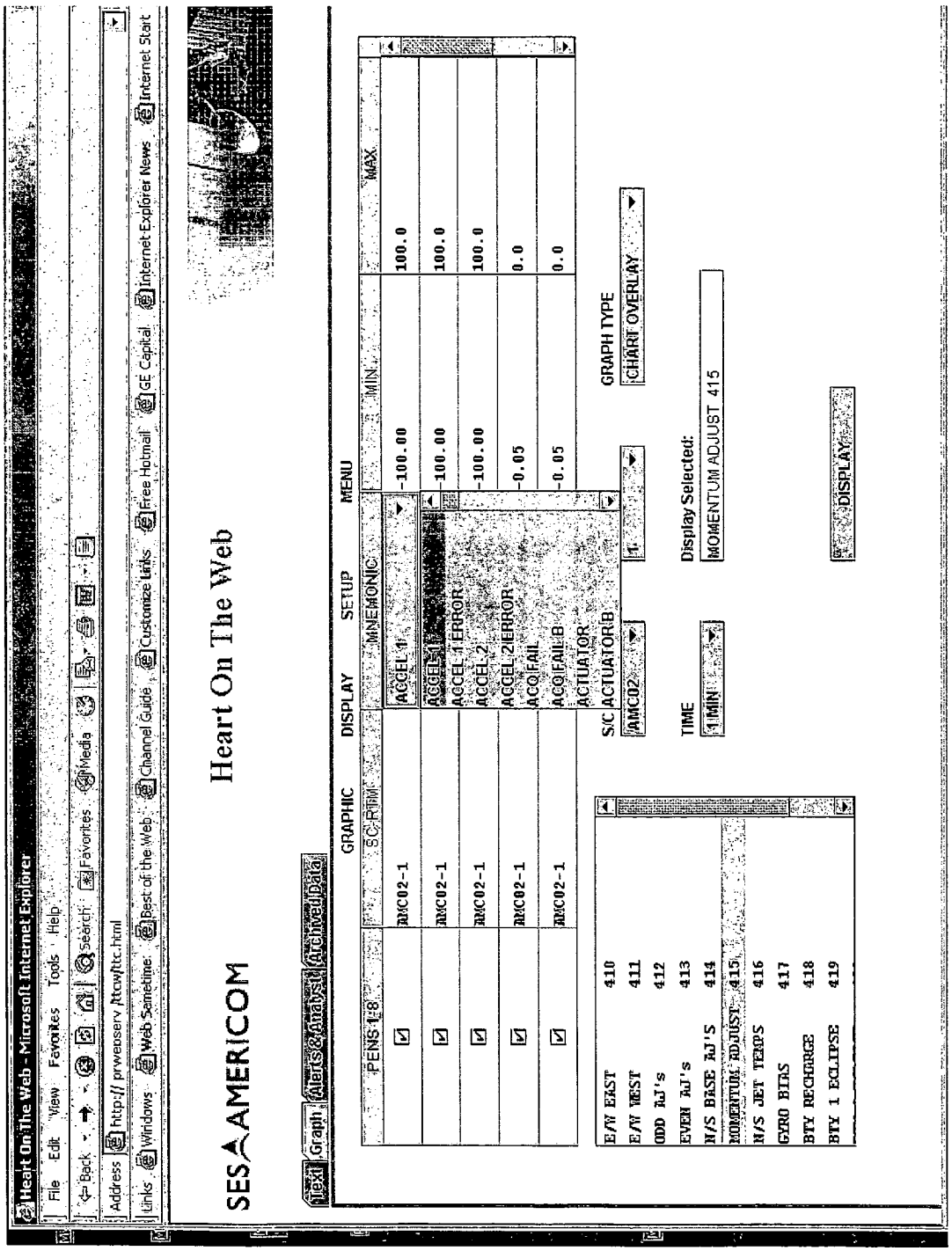
FIG. 15 shows an exemplary presentation of the eTlmClientApplet's graph panel with dynamic mnemonic selection support from graph panel's configuration table in accordance with the present invention.

One preferred embodiment of the invention supports the following three different real-time graphic display formats: ChartOverlay (illustratively shown in FIGS. 12 and 13), VideoStrip (illustratively shown in FIG. 14), and VerticalStrip (illustratively shown in FIG. 15). The clientGraphProxy 23 module is used in conjunction with the chartOverlay, videoStrip, verticalStrip and GraphRT modules to support the real-time graphic display functionality initialized from the GRAPH panel. As with the eTlmTextDisplays 16, each format of the eTlmGraphDisplays[22] may be updated using an array of eTlmGraphDisplay (GraphRT) 22 threads.

The eTlmClientApplet 15 initializes and manages a pool/array[] of threads dedicated to each active graph display, which pops up in an autonomous frame separate from the browser. Based on a user-specified time scale, the instance of the eTlmGraphDisplay/GraphRT 22 thread associated with the given initialized display will update at appropriate intervals with repeated calls to the server using the clientGraphProxy 23 to getSpecifiedShmValueServlet 24 communication link. This particular servlet will use the methods defined by the RemoteGraphSource 40 interface to activate remote invocation calls to the eTlmGraphServer 39. Alternatively, should the users wish to retrieve 72 hours of archived transponder data, the clientGraphProxy 23 to getSpecified72 hrValuesServlet 25 using the RemoteGraphSource 40 interface communication channel may be used.

Figure 16:
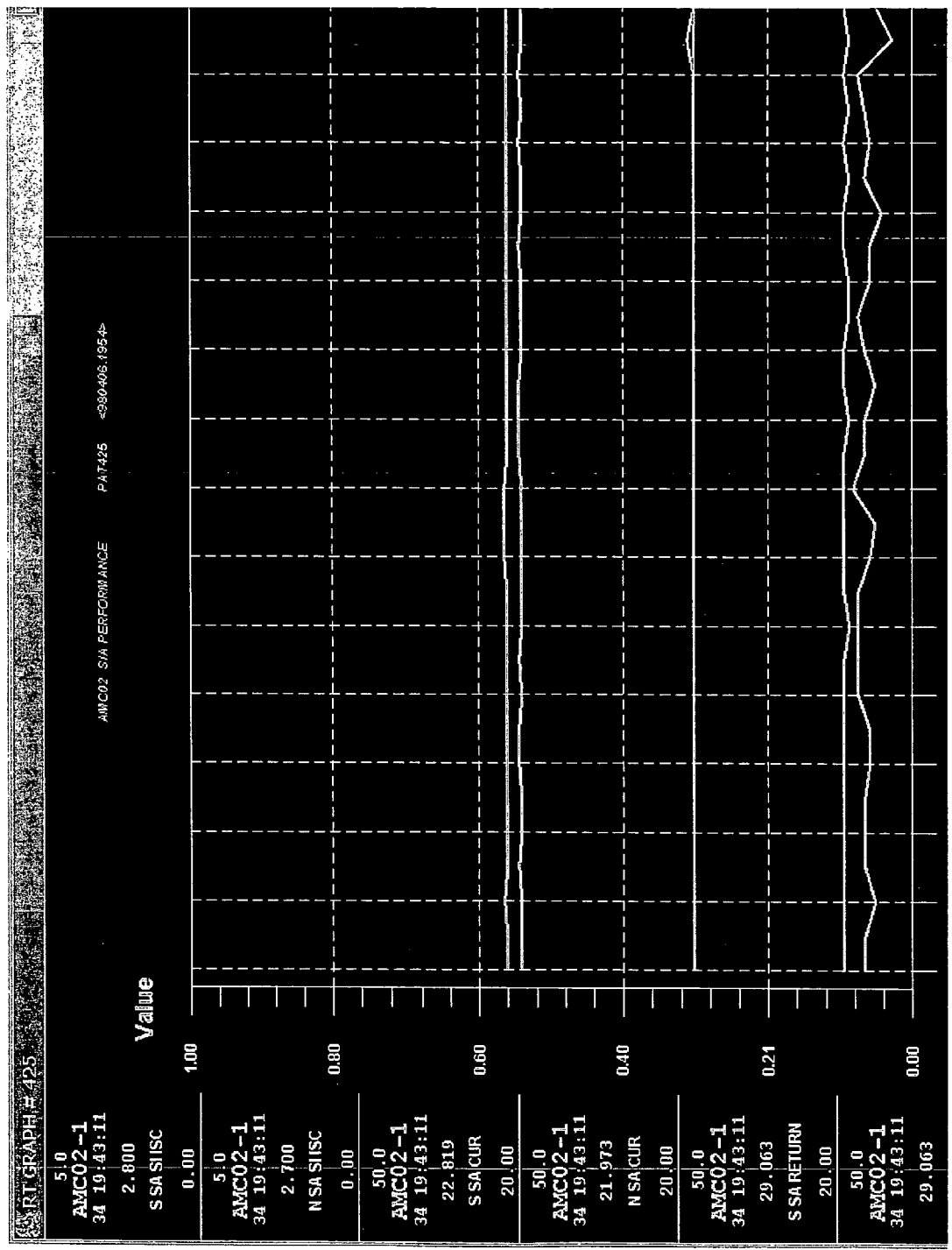
FIG. 16 shows an exemplary eTlmGraphDisplay application Chart Overlay version of graph format in accordance with the present invention.

The support of real-time graphical displays by the present invention is not limited to the previously mentioned formats. FIG. 16 shows an example of an alternative embodiment relating to the introduction of new north-south maneuver display formats, which is intended to be integrated within the next application release.

As previously indicated, the present invention supports a unique collection of archived data retrieval modalities. Specifically, Tier 2 supplies a comprehensive suite of archived data access modules that supports at least one and preferably all of Tier 2 flat-file archiving, customized Tier 3 HEART legacy telemetry archiving, and Tier 2 relational database archiving. This elaborate architecture provides a flexibility that no other existing TT&C system offers for support and access of archived data. The flexibility of the multi-thread relational database support of archived telemetry and TT&C data products introduces an enhanced capability that will solve many of the issues related to current methodologies of supporting archived telemetry and does so in a way that makes enterprise access as easy as it is secure. Simple expansions to the invention's relational database provide an infrastructure, which can support as extensive a set of full-featured archived data services as real-time data services.

Figure 17:
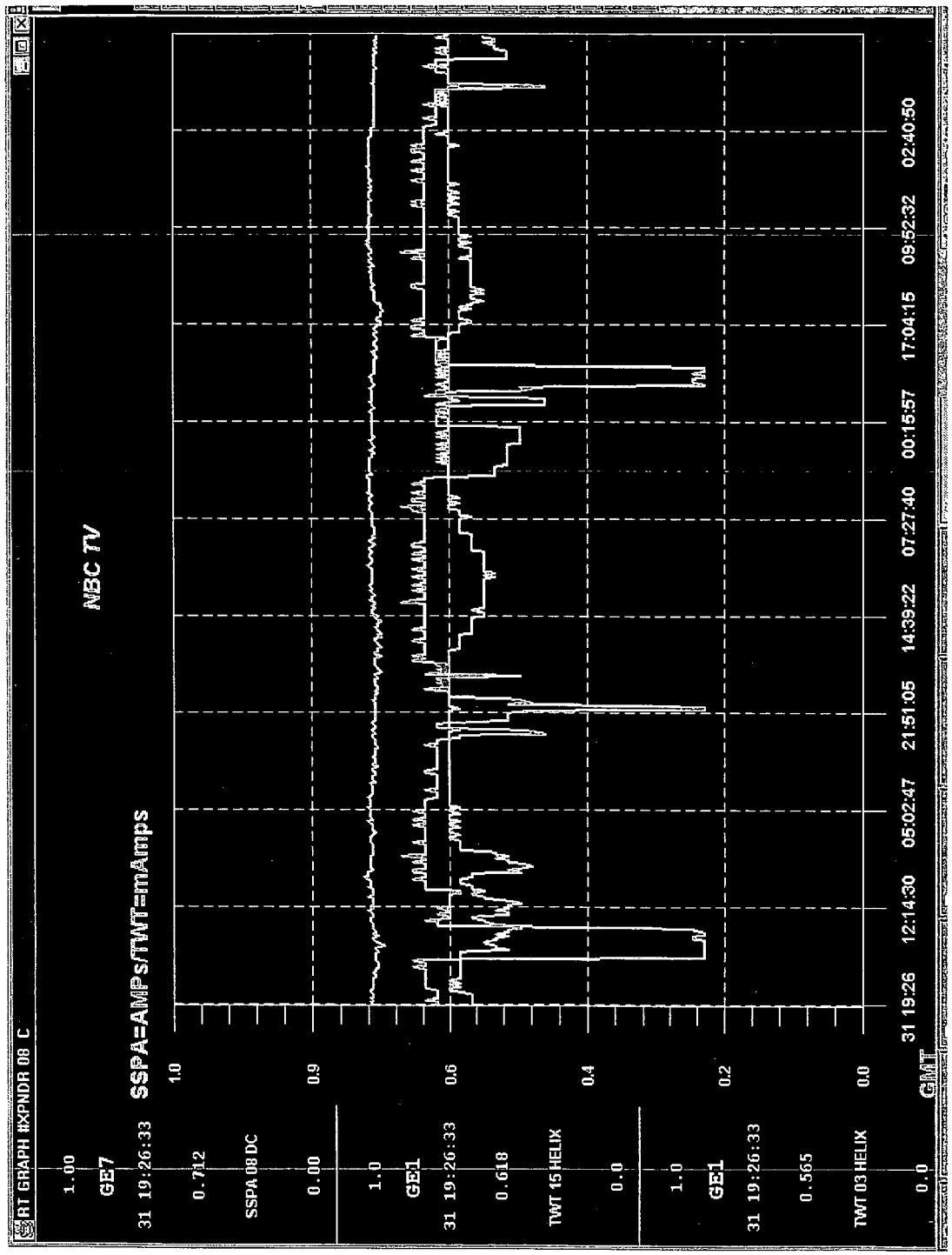
FIG. 17 shows an exemplary eTlmGraphDisplay application Chart Overlay version of the graph formats in accordance with the present invention.

In FIG. 2, a clientADProxy 30 dedicated to the archived data request panel is provided. From the archived data request panel, users can define all or a portion of the data fields intrinsic to the RemoteADSource 38 object. Using the ClientADProxy 30 channel of communication, the archived data panel (illustratively shown in FIG. 17) will update the scrolled list of mnemonics on the left side of the panel based on a given SC/RTM/SUBSYSTEM specification provided by the user. Users will highlight the mnemonics of interest from the scrolled list, and the highlighted mnemonics will immediately populate the scrolled list on the right side of the panel dedicated to any particular request.

Figure 18:
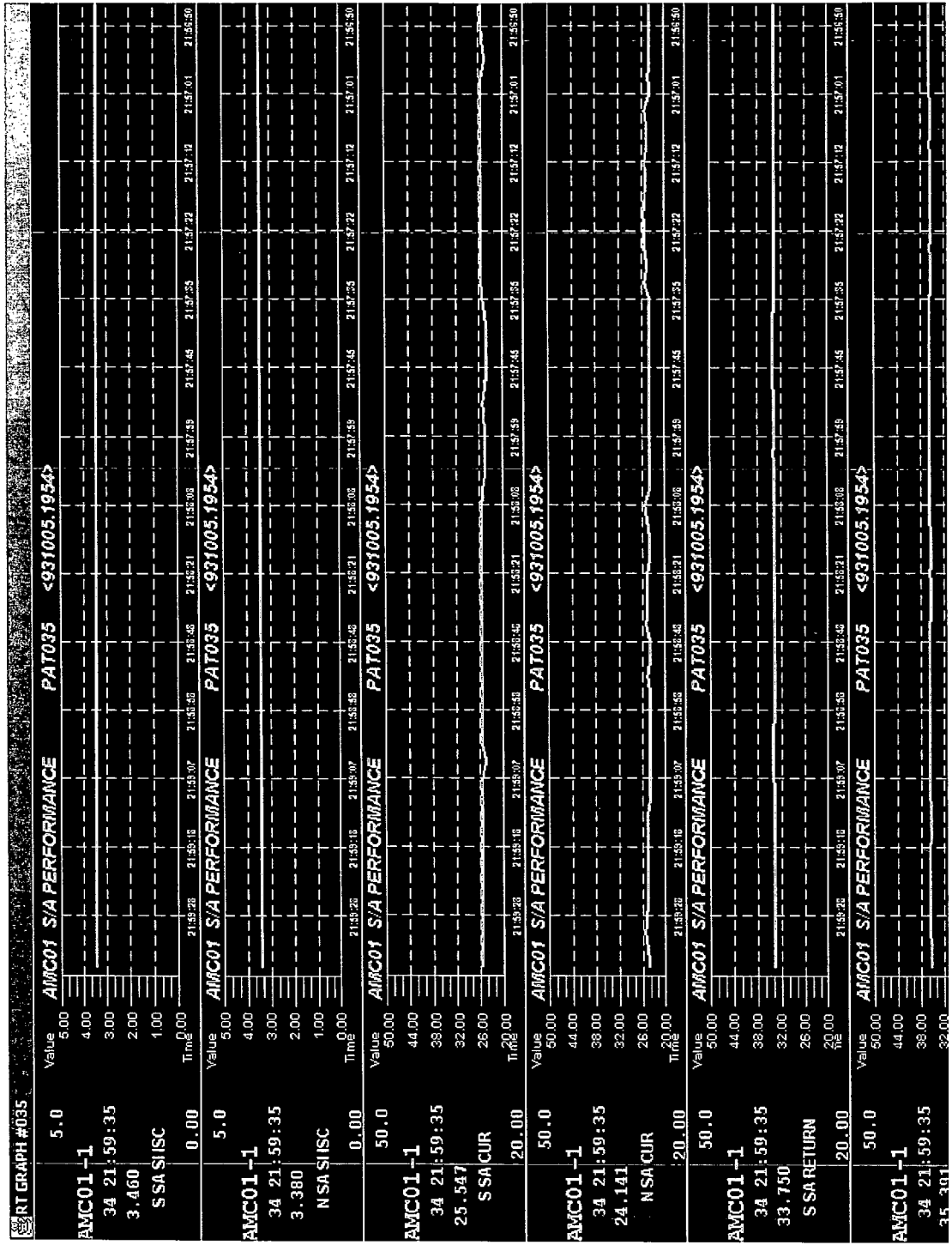
FIG. 18 shows an exemplary eTlmGraphDisplay application Video Stripchart version of the graph formats in accordance with the present invention.
Figure 19:
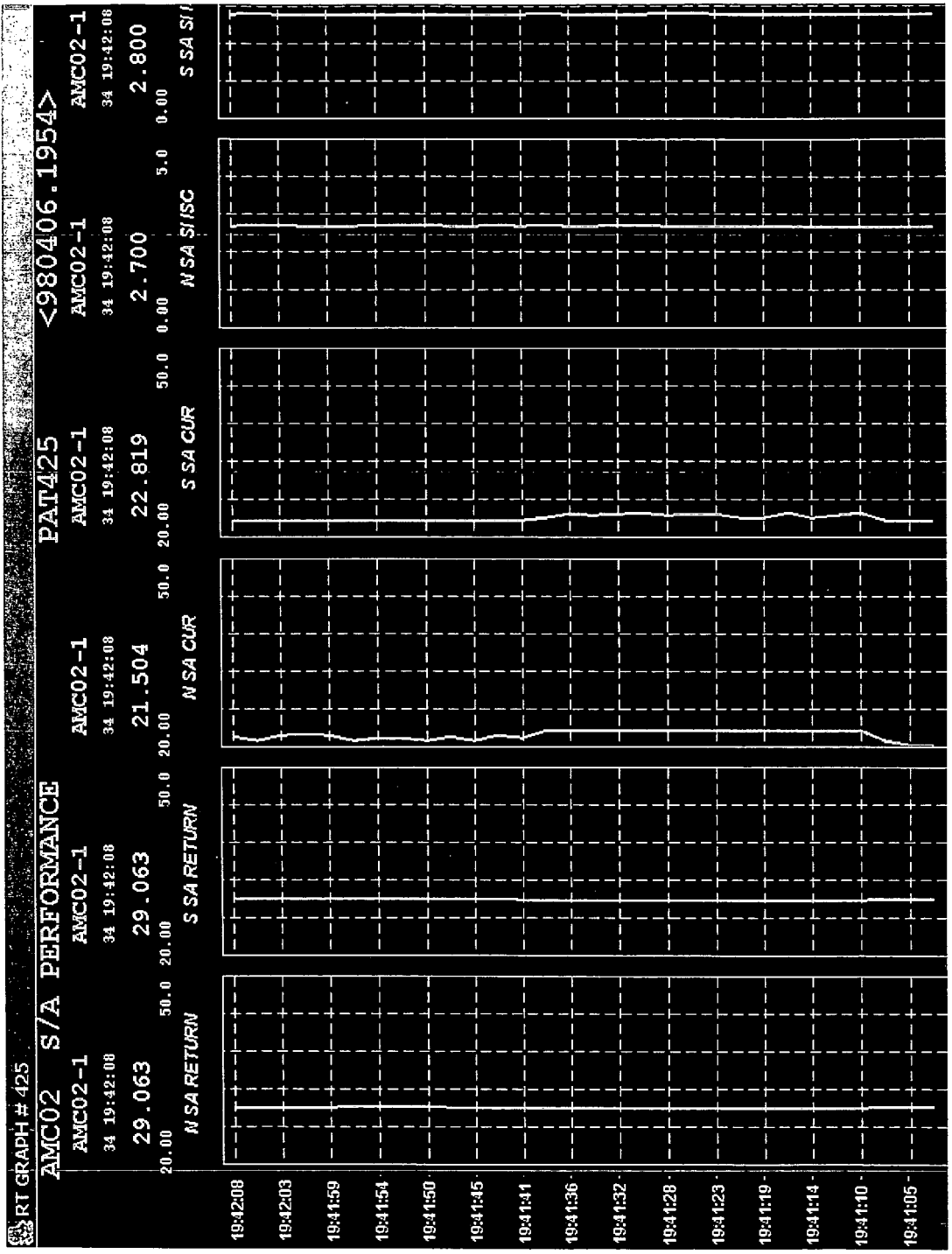
FIG. 19 shows an exemplary eTlmGraphDisplay application Vertical Stripchart version of the graph formats in accordance with the present invention.

When the complete list of mnemonics is specified, users will enter the start and stop time for their particular request. When the users issue archived data directives, the ClientADProxy 30 to eTlmADServlets communication link is used. The eTlmADServlets will invoke the appropriate method defined by the RemoteADSource 38 interface to complete invocation of the eTlmADServer 37 function. More specifically, users will use the appropriate submitADRequestServlet 31, getADStatusServlet 32, or retreiveADRequestServlet 33 depending on what phase of the archived data request sequence is being executed. (See FIGS. 18 and 19).

Figure 20:
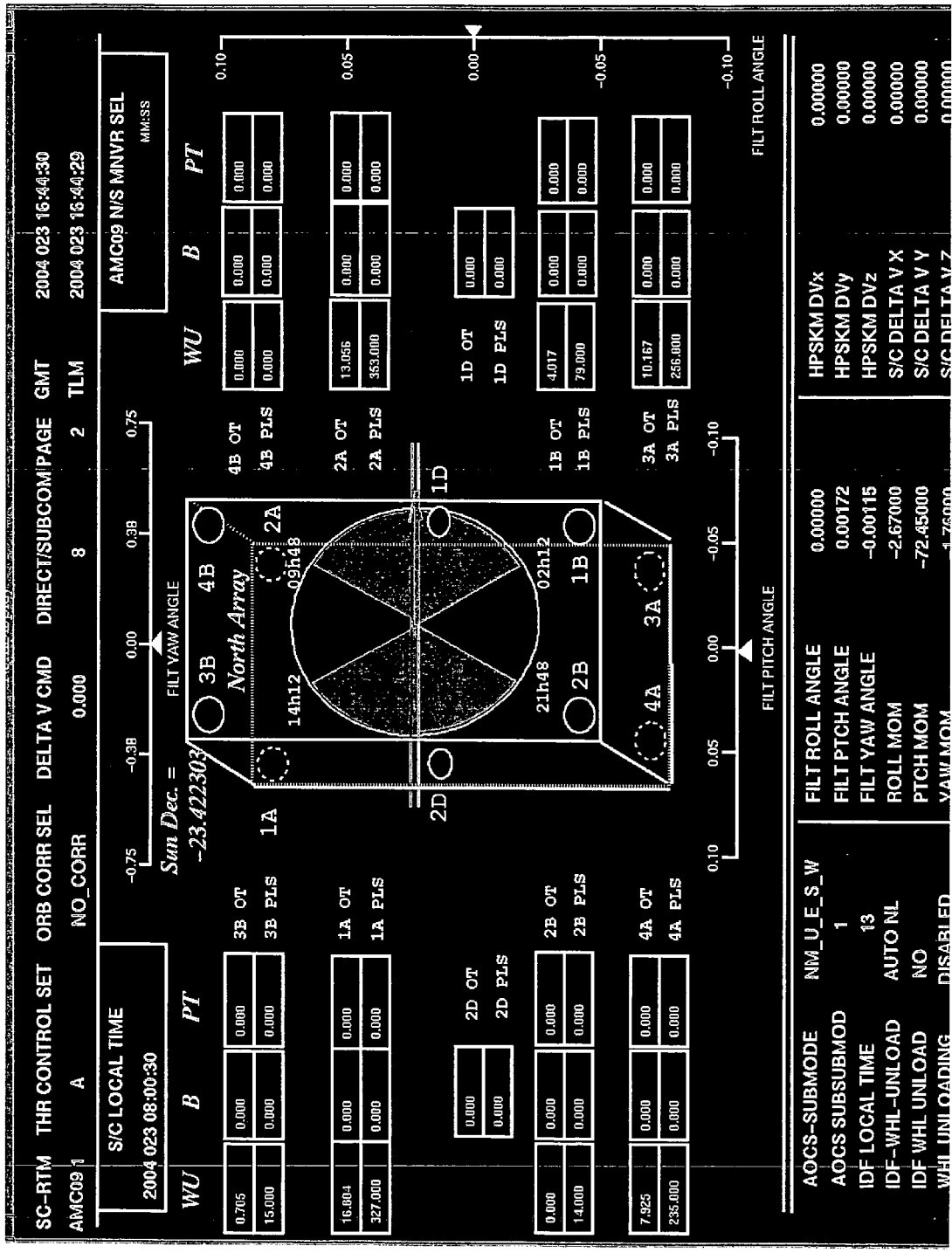
FIG. 20 shows an exemplary display of alternative embodiment deploying North South Maneuver graphical format in accordance with the present invention.
Figure 21:
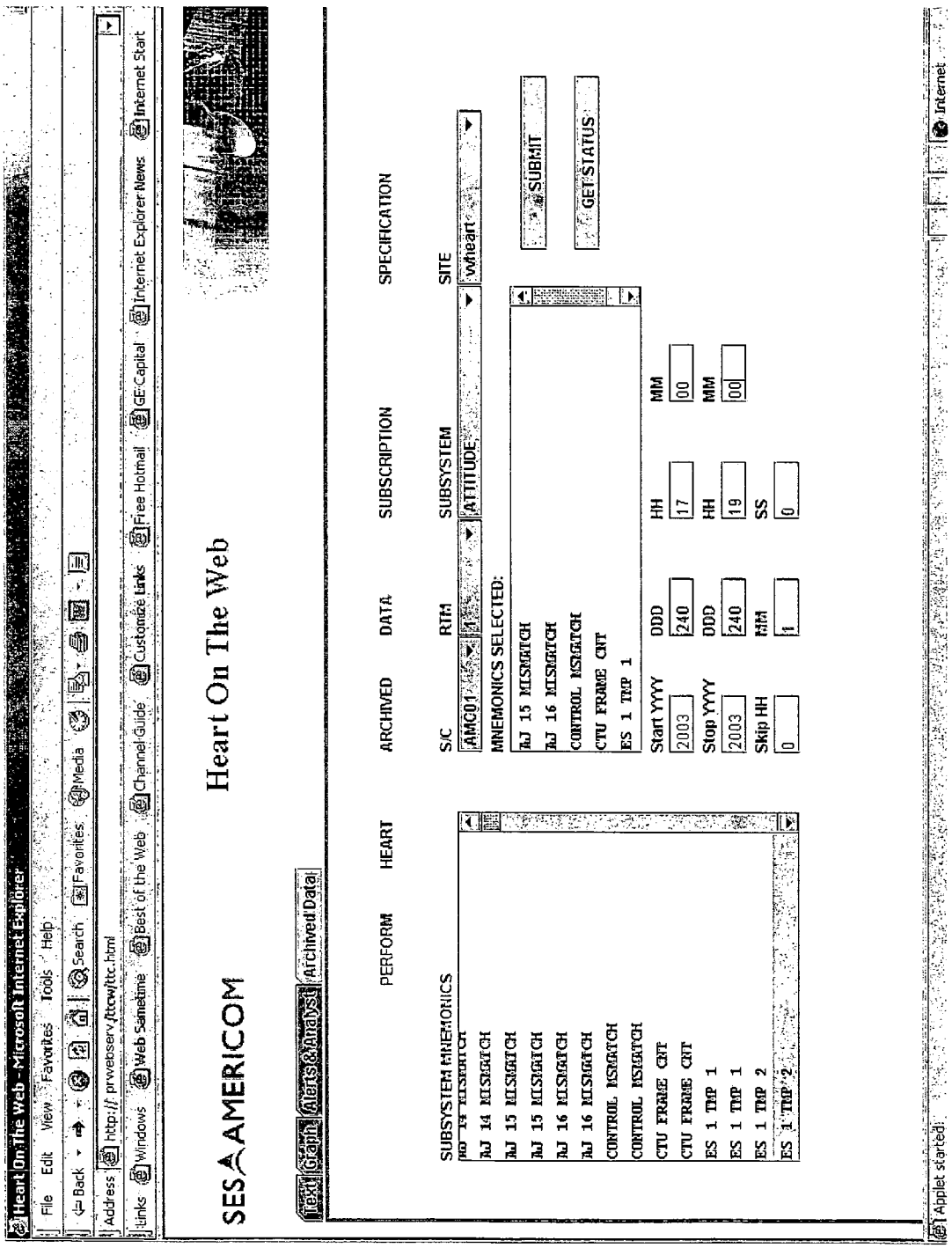
FIG. 21 shows an exemplary presentation of the eTlmClientApplet's archived data panel in accordance with the present invention.

Following the retrieval phase of the archived data request sequence, the file containing the archived data results will be downloaded to the user's PC. A customized version of application's graphs, eTlmAdDisplay 29, has been designed to support the display of results of a given archived data request. Unlike the real-time graph displays, the archived data graph supports zoom-in/zoom-out viewing functionality, as illustratively shown in FIGS. 20 and 21.

The archived data graph preferably uses a customized thread pool mechanism similar to all other application displays. Use of this mechanism ensures that the interactive nature of the display does not interfere with other displays or the eTlmClientApplet 15. In addition, because the client to RMI server communications scheme supported for all applet communications uses an indirect communication channel to the Tier 3 archived data server, an enhanced threading mechanism is used to improve applet performance. The Tier 1 display thread pools also guarantee that data updates to a single display are not corrupted with data updates to other displays.

FIG. 3 shows the Tier 1 communication channels, thread pools, and applet/browser transactions dedicated to application functions supported in the alert & analyst panel (illustratively shown in FIG. 22) of the eTlmClientApplet 15. This sub-application of the invention allows users to view all the alerts generated by the fleet of geosynchronous satellites as well as the TT&C WAN legacy system servers. In addition, users can monitor all outgoing spacecraft commands and view all pending command lists from all remote TT&C sites prior to transmission. This activity is highly desirable for purposes of coordinating scheduled satellite procedures.

The panel/GUI functionality required for the alert/analyst application panel does not require as many clientAppProxy 19 communications as the other application panels, and as such may be implemented to only support auditing activities that occur over the clientAppProxy 19 channel. The clientAlertProxy 27 to getAlertsServlet 28 channel of communication allows users to specify a session alert filter for given archived data or a real-time session eTlmAlertDisplay 26. Users may set up a session filter specification as a function of ALERT TYPE, SOURCE NODE, SOURCE SITE, and PRIORITY. In the case of archived alert data, users can specify the start time and stop time for any given archived data requests.

The filter specifications may be the same for the enterprise system as for the legacy TT&C system. Alert-types filter specifications include: commands, database, comment, log, crg, video and simulated. Source Node specifications include: cnt1, crg1, crg2, xvid, xvideo, tpu1, tpu2, . . . tpu5 and heart. Site specifications include a predetermined number of possible geographical site locations that make up the legacy TT&C distributed WAN of servers. In one embodiment, ten geographical site locations are used. Users may also specify any one of a variety of TT&C supported priority levels.

Figure 23:
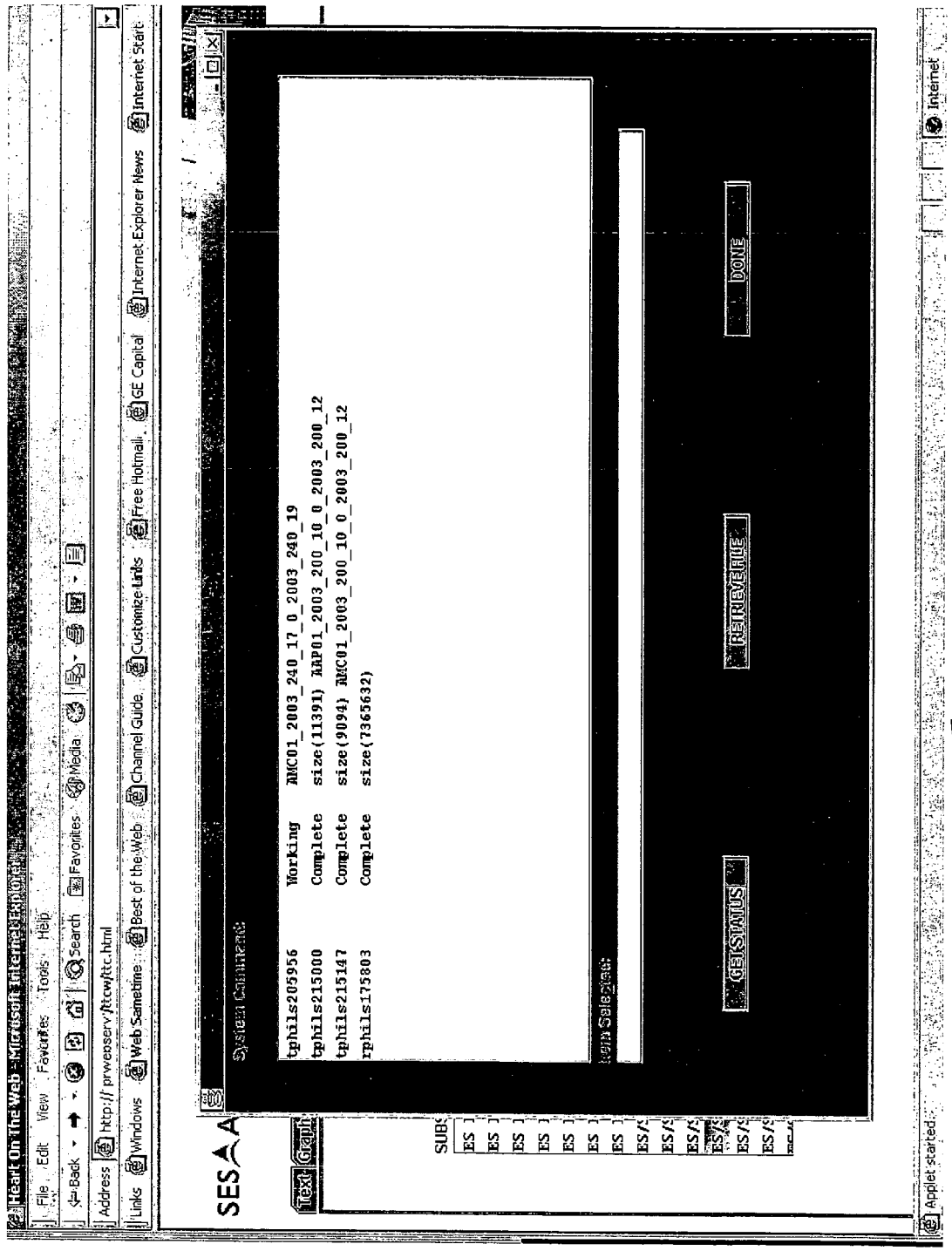
FIG. 23 shows an exemplary presentation of the eTlmClientApplet's HeartRequestStatusMenu subordinate application panel display in accordance with the present invention.

Upon completion of the definition of the session alert filter, users will issue either ALERT ARCHIVED or ALERT REAL-TIME directives. As previously mentioned, using the clientAlertProxy 27 to getAlertsServlet 28 communications link, the application will establish an application alert display using the eTlmAlertDisplay 26 thread pool. If the user issued a real-time alert display directive, the alert display (illustratively shown in FIG. 23) will continuously update real-time with the TT&C alerts based on the session's alert filter specification. If the users issue the archived directive, the display may be updated once with all the alerts matching the alert query specification. The alerts may include a result set from the Tier 2 relational database of 250,000 stored fleet/TT&C server status alerts. Moreover, the alerts may be stored in the AlertRtnData data object returning from the eTlmAlertServer 45 and the same display shown in FIG. 23 maybe used to present these alerts.

Figure 22:
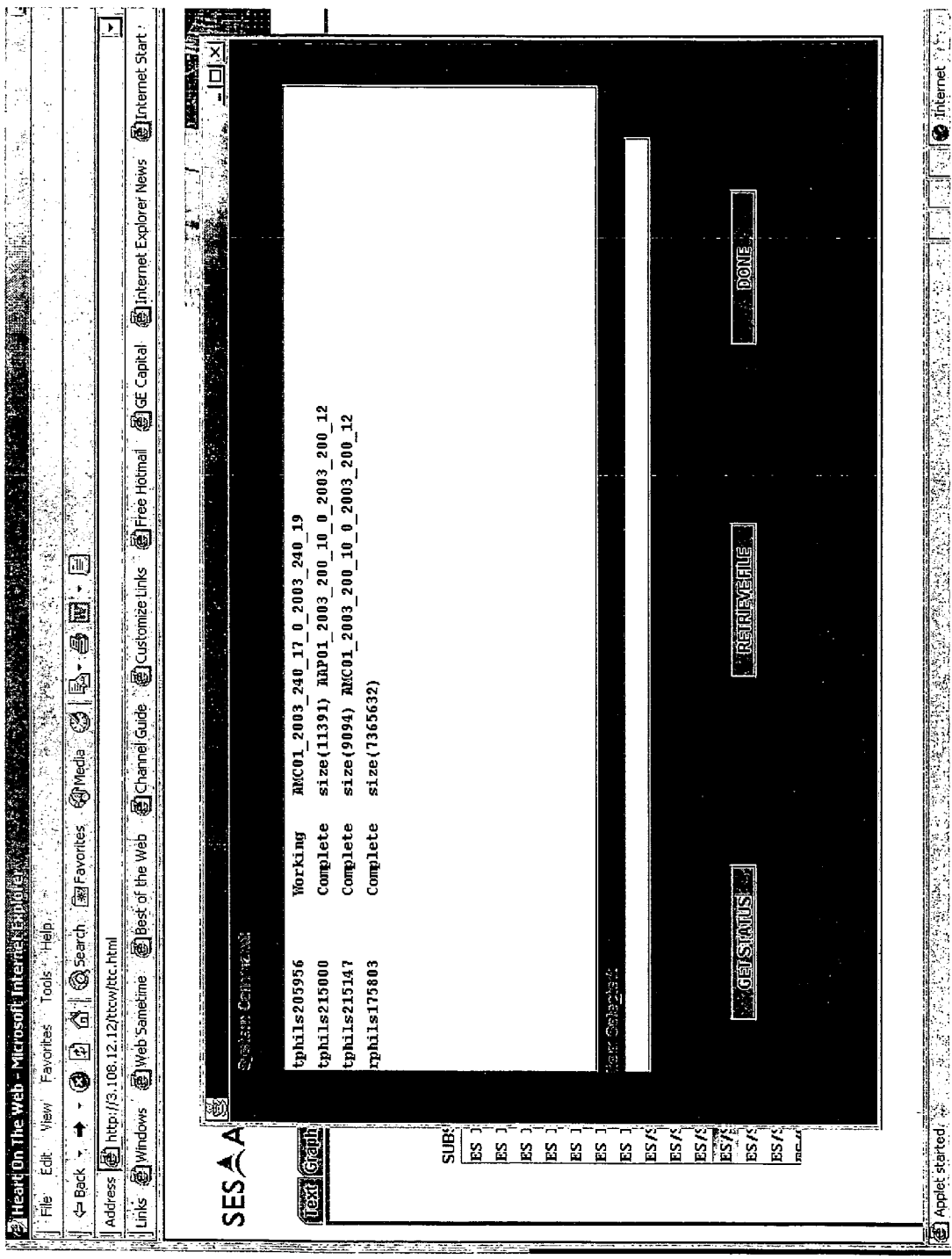
FIG. 22 shows an exemplary presentation of the eTlmClientApplet's HeartRequestStatusMenu subordinate application panel display in accordance with the present invention.
Figure 24:
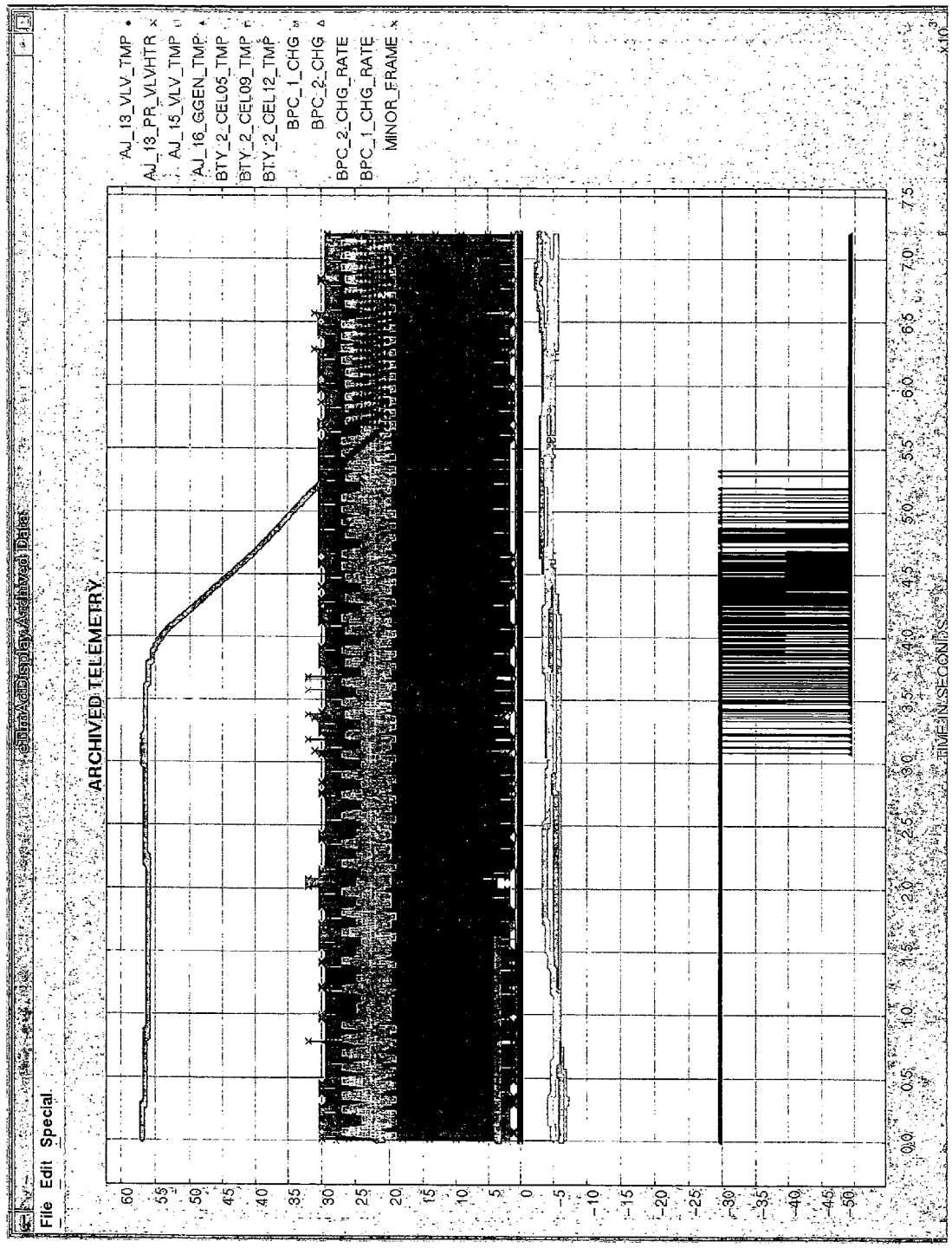
FIG. 24 shows an exemplary eTlmAdDisplay specialized application display supporting archived data (full scale output mode) in accordance with the present invention.
Figure 25:
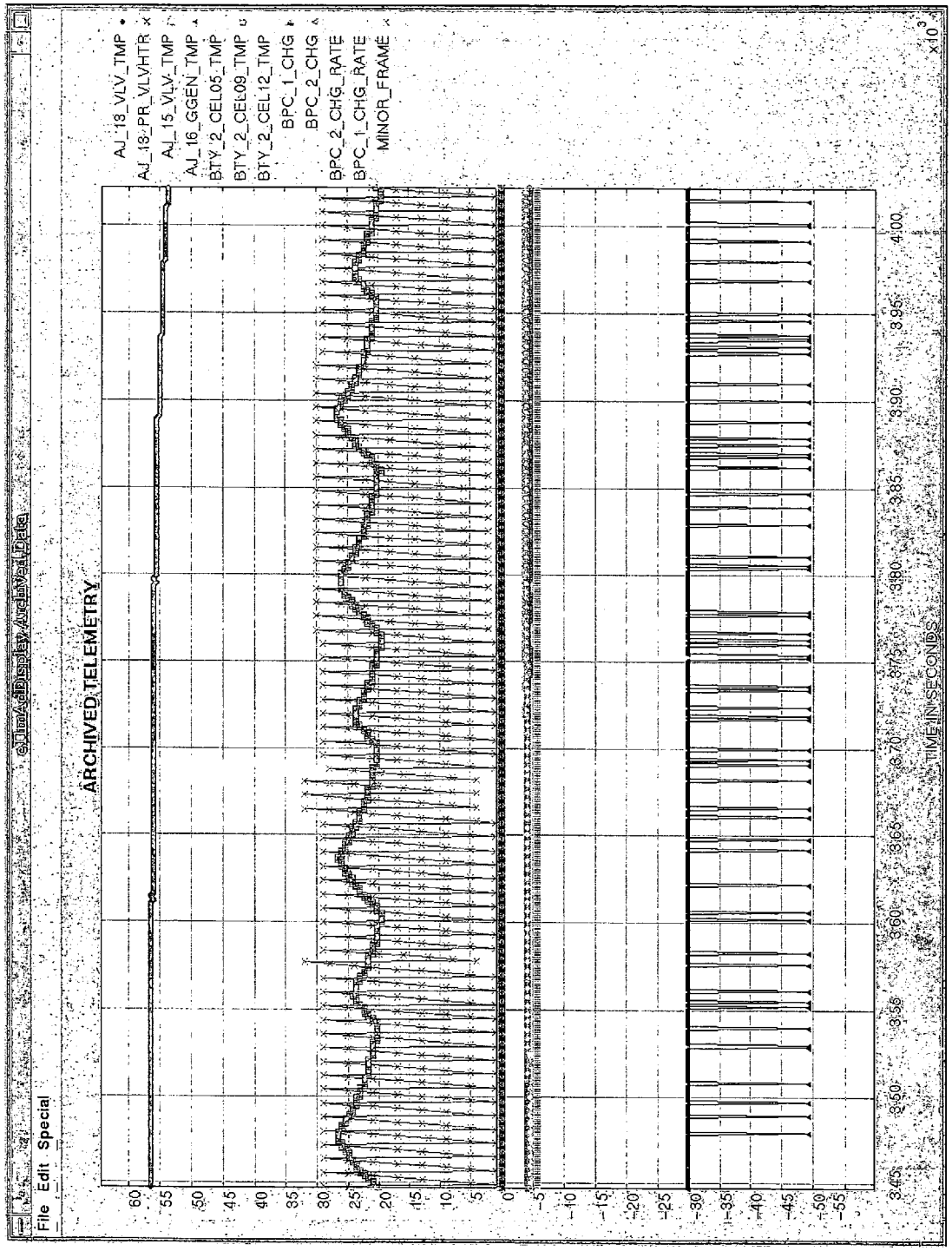
FIG. 25 shows an exemplary eTlmAdDisplay specialized application display supporting archived data (zoom in output mode) in accordance with the present invention.
Figure 26:
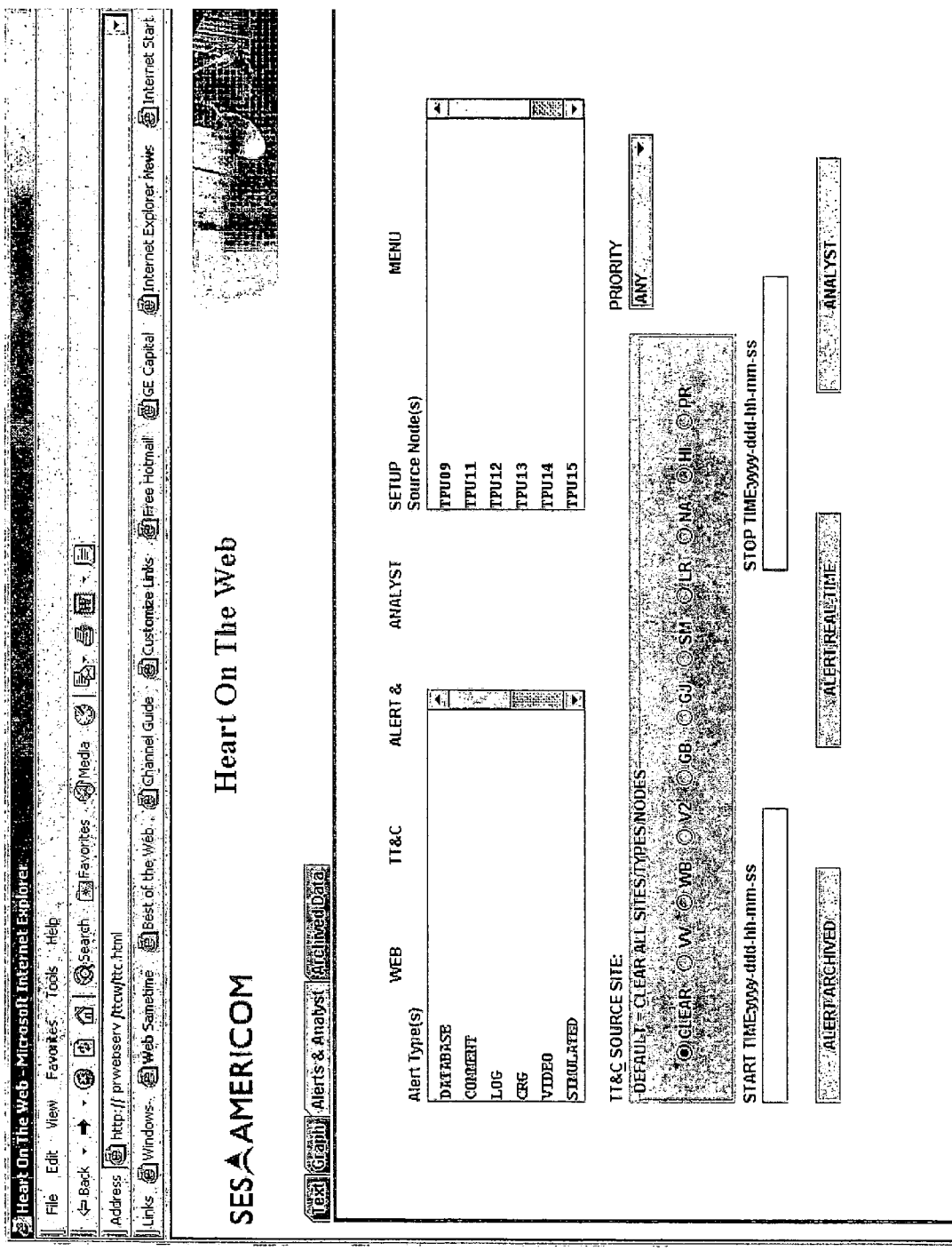
FIG. 26 shows an exemplary presentation of the eTlmClientApplet's alert & analyst panel in accordance with the present invention.

Another application option available to users from the alert & analyst panel is the ANALYST option appearing at the bottom left region of the panel shown in FIG. 22. The eTlmAnalystDisplay 34 thread pool supports a composite text display (illustratively shown in FIG. 24) which includes two real-time updating scrolled lists, one dedicated to alerts and one dedicated to pending commands. To achieve this, the design supports the filter specification and clientAlertProxy 27 to getAlertsServlet 28 channel of communications describe above for the eTlmAlertDisplay 26. In addition, a second communication channel to Tier 2 is required to update the pending command scrolled list. The pending command communications channel preferably includes the following data transaction sequence: create CmdData object, execute ClientCmdProxy 35 pending command retrieval method, invoke getCmdServlets 36 using the CmdData object as input object for remote invocation to eTlmCmdServer 47, and return data to client using getCmdServlets 36 and the CmdRtnData object. As a result of the multiple RMI server dependence, the eTlmAnalystDisplay 34 thread pool is preferably designed to synchronize both the eTlmAlertServer 45 and eTlmCmdServer 47 communication channels concurrently for its real-time updates.

Figure 4:
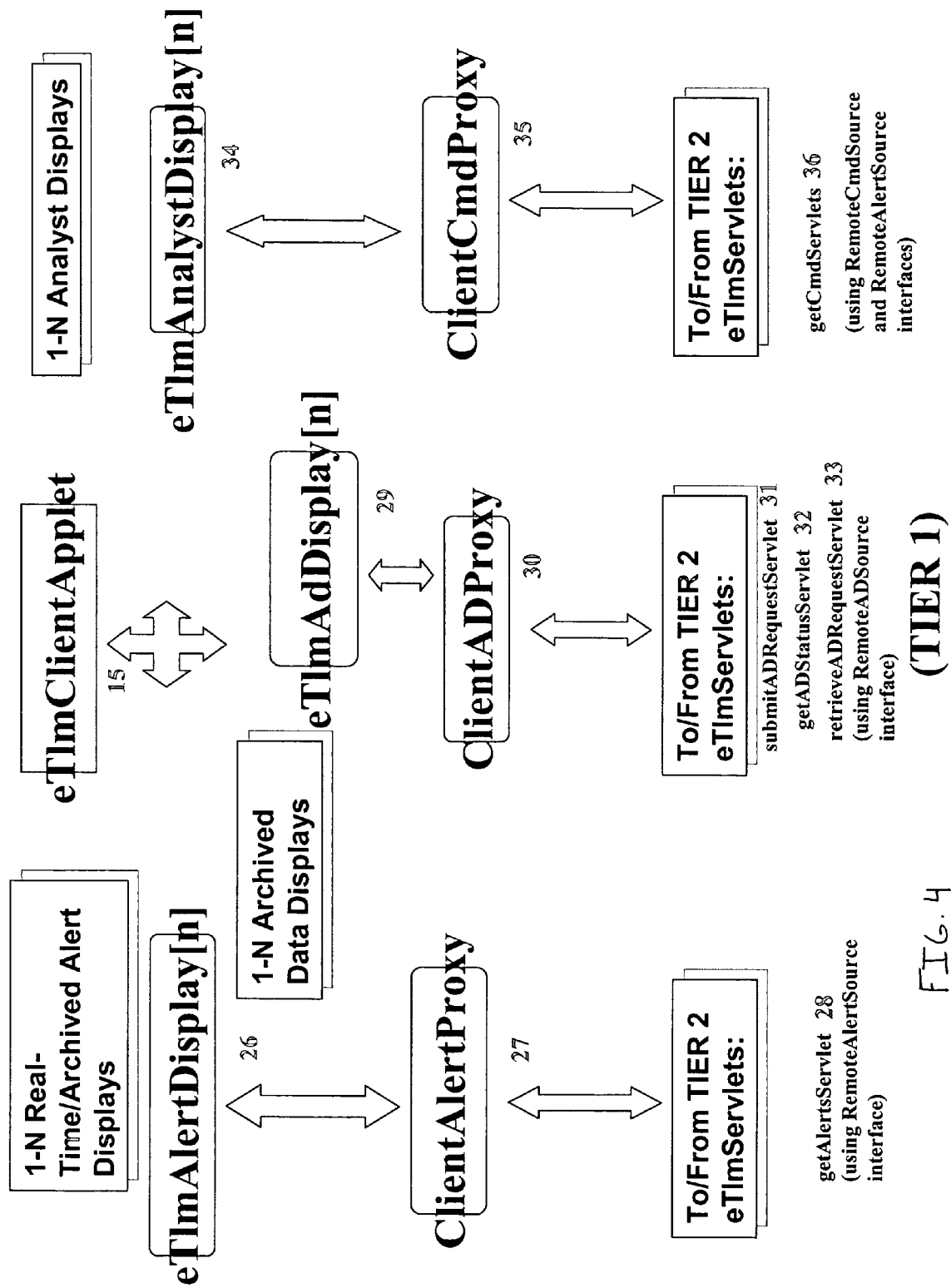
FIG. 4 is a diagram showing another portion of the TIER 1 (e.g., Applet/Presentation Layer) software modules and associated architecture which may be included in the system of the present invention

FIG. 4 summarizes Tier 2 (middle or business logic Layer) portion of an enterprise application design paradigm in accordance with a preferred embodiment of the present invention. The diagram captures the bi-directional transactional flow of Tier 1 (presentation layer) to Tier 2, as well as Tier 2 to Tier 3 (TT&C data layer/data management layer) communications. The middle layer software infrastructure provides essential services for deploying full-featured, scalable and secure transactional applications from within the N-Tier architecture of the invention. As the diagram portrays, the client proxy scheme of Tier 1 makes use of the deployed open-source Apache HTTP server integrated with the Tomcat servlet container. Directly integrated into the Tomcat servlet container are the servlet modules of the invention, which are listed under the "1-N eTlmServlets" heading label in the diagram.

The invention incorporates a comprehensive collection of servlet modules that are preferably designed as a secure JAVA-based solution of data exchange that avoids the more problematic Common Gateway Interface (CGI) approach to extending the functionality of an HTTP server. The JAVA-based servlets are more efficient, easier to use, less expensive to maintain and as was previously discussed more secure than the CGI alternatives. The servlet modules also support servlet instance creation and the associated initialization of service methods assigned to a particular servlet. In addition, the servlet modules may be designed to support the standard doGet, doPost, doPut, and doDelete servlet functions as a function of HTTP request type.

In general, when the web server processes servlet requests, the server spawns a new thread and calls the appropriate invention's servlet service. The servlet module will execute the servlet's customized doPost servlet function and invoke the appropriate invention's RMI server method based on the TIER 1 client's request. The servlet modules provide more that just a secure communication channel which extends the web servers supported functionality using an HTTP protocol. The servlet module also preferably serves as a method of web server communication redirection, which is desirable for purposes of providing extranet deployment of the invention. This gives the N-Tier application the ability to deploy the core Tier 2 functionality on a web server located, for example, on an internal corporate LAN segment that is accessible to the entire Tier 3 mission critical server, and to deploy a separate web server at the company's customer web center external portal. The installed servlet module on the extranet web server redirects incoming client requests to the internal web server supported RMI services. This architectural flexibility allows for a wide array of application deployments.

The servlet redirection mechanism allows for the unique method of introducing alternatives to the current configuration of two web servers. The infrastructure of web servers can be sized to support optimal performance concurrent with optimal application functional integration. For instance, the current configuration can be instantaneously expanded to include a separate web server dedicated to simulation and training. For training modalities, the Tier 1 applet of the invention may allow users to select the training option. Based on this specification, all servlets would redirect communications from the real-time Http web server to a training Http web server that runs exactly as described above for real-time Tier 3 data sources, but that instead communicates with an autonomous web server that specializes the processing of simulated and historical telemetry source.

The architecture supporting the Tier 2 to Tier 3 communication modules may be formed so that the Tier 2 design performs independent of the nature of the Tier 3 data source. As a result, within this single enterprise application, users could access real-time, simulated, historical telemetry sources. And, based on the servlet redirection scheme outlined above, the real-time data sources would be accessed from one web server and the training data sources would be accessed from totally independent web server. The software modules on the Tier 2 platform are preferably designed to handle all invention telemetry sources without modifications. This unique invention attribute comes from the open-source basis of the design. Alternative web-server configurations are relegated to duplicating the Tier 2 software modules on a separate web server without concern of additional licensing and maintenance cost considerations. A simple duplicate and deploy modality goes into play.

The same flexibility can be invoked to address optimal performance deployments as well as special deployments to support outside leased transponder customers that require their own customized web server. Here, the resident Tier 2 leased transponder customer-dependent presentation level controls can be employed in conjunction with the duplicate and deploy strategy of Http web server configuration to provide special internal or external customers with a web server almost on demand.

The same duplicate and deploy configuration strategy describe above with respect to an open-source web server configuration may be applied to the open-source database server configuration. The invention's unique architecture design may allow the database to be distributed to multiple database servers, thereby allowing for deployment of a relational database server on as many workstations as possible within the enterprise-based TT&C WAN. The parallel processing of multiple telemetry archives for multiple satellite application functions gives the invention significant growth potential and flexibility at a price lower than can be achieved by existing systems.

The design of the servlets and the associated input and output serialized object is preferably as diverse, robust and comprehensive as the nature of data exchange that is implemented to support the full-featured set of enterprise requirements of the invention. An exemplary list of invention servlets is as follows:

> GetTelemetryServlet 18
> AuditServlet 21
> SubmitADRequestServlet 31
> GetADStatusServlet 32
> RetrieveADRequestServlet 33
> getGraphShmValuesServlet 24
> getGraph72hrValuesServlet 25
> eTlmAppServlet 20
> getAlertsServlet 28
> getCmdsServlet 36

Returning to FIG. 4, the diagram next displays the bi-directional nature of the communication links from the aforementioned application servlets to the Tier 2 customized compliment of RMI servers. These servers are portrayed under the "1-N eTlmServlet to 10 eTlmServers" label at the top/middle portion of the FIG. 4 Tier 2 diagram. The JAVA-based RMI protocol is ideally suited for the task of coordinating data exchanges between Tier 1 and Tier 3. The Remote Method Invocation (RMI) protocol may best be characterized as a JAVA-based object-oriented implementation of the Remote Procedure Call protocol predecessor introduced by Sun Microsystems years ago.

More specifically, the RMI protocol supports the multi-threaded remote distribution of objects among JAVA applications on multiple network nodes using remote and distinct JAVA VIRTUAL MACHINES. The distributed objects serve as vehicles of the data to be exchanged. In order to implement remote object distribution, the RMI API may use an object serialization scheme to convert objects into byte streams before transmitting the stream to a remote platform, which reconstitutes the byte streams into objects again.

In addition to serialized objects, the RMI API may make extensive use of interfaces. All RMI clients and servers use an interface for a remote serialized object. To create a remote object, an interface module must be generated. The Remote interface defines method prototypes that are associated with various remote objects. It can be said that a remote object is an instance of a class that implements the remote interface. The RMI server is one such implementation of a defined RMI interface.

Two separate approaches may be used for the RMI server design. The eTlmADServer 37, eTlmTextServer 41, eTlmGraphServer 39 and eTlmAppServer 43 are basic RMI designs that use the resident functionality of the JAVA RMI API. As such, these are multi-threaded servers (as is the case of all RMI servers) which serve their appropriate functional role in a synchronous communication channel using the default threading managed by the resident RMI API.

The eTlmAlertServer 45 and eTlmCmdServer 47 make use of customized enhancements to the eRMI API functionality providing for application-managed priority thread pools and enhanced support of both asynchronous and synchronous communication channels. Instead of using a default RMI threading mechanism, the enhanced design manages and maintains its own thread pool in the form of an application-based priority queue. This may be employed to anticipate increased application loads as the user base expands. The enhanced RMI servers may also be deployed because of the nature of the communications required to support the alert and analyst application displays.

The eTlmAppServer 43 is used to update the eTlmClientApplet 15 with the correct information as defined by the legacy TT&C-based shared memory segments. The eTlmAppServer 43 may support all or a portion of the following functions: auditStart( ), auditFinish( ), getSatellites( ), getcustomers( ), getCannedOptions( ), getPatfileData( ) and getMnemonics( ). Within the functionality supported by the eTlmAppServer 43, methods exist to dynamically restrict or expand applet presentation as a function of customer ID. The design can distinguish whether the user should have access to the total application functionality or some predetermined subset of application functions.

For instance, spacecraft vendors may have access via the extranet to text, graph, alert and analysts displays for only those fleet satellites that they have manufactured. Access to other fleet satellites may be blocked. The same customer ID mechanism may allow the eTlmAppServer 43 to configure the eTlmClientApplet 15 for only graph displays related to transponders leased by a particular outside customer (both real-time and 72-hour archived displays). Based on input of a valid customer ID, the server may determine that the user receives access to transponder graphs only and sees the set of leased transponders based on a Tier 2 cron process that executes 1 time every 24 hours and generates the tables for updating an external customer transponder tracking mechanism. The serialized objects supported by the eTlmAppServer 43 interface include Command and Screen data objects.

The eTlmTextServer 41 implements the RemoteTextSource 42 interface and supports all or a portion of the following functions: getTelemetry( ), stopTelemetry( ), and expandMnemonics( ). The RMI server is primarily used to update real-time single spacecraft text display, multiple spacecraft text displays, and out-of-limit text displays supported within the eTlmClientApplet's 15 text panel. The remote serialized objects supporting the communication exchanges server by the eTlmTextServer 41 include the following class modules: Command, Mnemonic, Screen and Telemetry.

The eTlmGraphServer 39 implements the RemoteGraphSource 40 interface and supports all or a portion of the following functions: getShmValue( ), getSpecifiedShmValue( ), getSpecified72 hrValues ( ), and getSpecified72 hValue0( ).

The eTlmGraphServer 39 supports real-time updates to all real-time graph display formats using the JNI interface to the legacy TT&C-based shared memory segments. The eTlmGraphServer 39 also supports a specialized 72-hour archived graph display format dedicated to transponder performance data for all outside customers based on customer ID. The following serialized objects support the eTlmGraphServer's 39 data exchanges: Data, DataArray, Graph72 hrReq, ScIndexTable and ScTableInstance.

The eTlmADServer 37 implements the RemoteADSource 38 interface and preferably supports all or a portion of the following functions: submitADRequest( ), getADStatus( ), and retreiveADRequest( ). This server is used to interface with a Tier 3 GUISERVER on port GUISERVER_PORT at any of the three IP addresses of the respective legacy TT&C WAN network locations dedicated to the archived data servers.

The submitADRequest( ) method of the eTlmADServer 37 implements a customized JAVA-based TCP/IP socket communication and messaging sending module tailored for messages supported by the Tier 3 GUISERVER supporting MsgConnect, MsgDisconnect, MsgAck, MsgGetProcessedData, MsgGuiNotify, and MsgGuiReqStatus message distributions. From the vantage point of the GUISERVER, it appears the communications are coming from a typical C-based TT&C client. The serialized objects designed to support the RMI server interface communication scheme are preferably as follows: ArchivedData, ArchivedStatusRtnData and ArchivedRtnData.

With the introduction of the interface to the legacy TT&C system's archived data source, an alternative embodiment of the present invention may be easily adapted for internal training requirements. Using the same TCP/IP communications modules to support processed data requests, this embodiment can support raw data requests to the legacy systems archived data server. The invention is designed to issue the appropriate remote shell system command to a Tier 3 control workstation that would take the raw data returned from the archived data source and use a Tier 3 TPU to replay the historical data as if it were coming down from a satellite in real-time. With the extensive archived data capabilities of the Tier 2 design, these training sessions could be stored for future use using a flat file or relational database storage strategy. The training web server may require trivial changes to the present embodiment and may serve as a testimony to the uniquely robust and flexible Tier 2 architecture that anticipates future enhancements.

The eTlmADServer 37 implements a unique and most secure method of communications with a mission critical Tier 3 TT&C server. Here, an RMI server communicates to the Tier 3 server with a JAVA-based TCP/IP socket communication module while concurrently communicating with Tier 1 using an http tunneling scheme deployed for Tier 1 to Tier 2 communications. From the point of the user applet, the communication takes place over port 80. With this communication mechanism, the invention implements one of its preferred implementations engineered to overcome all the problems associated with enterprise communications with a mission critical server. Another implementation will be discussed with the servers dedicated to processing TT&C alerts and pending commands. This methodology may advantageously be used to make internal servers accessible from the enterprise application.

Introduction of the archived data interface is beneficial because it allows an object-oriented JAVA programming language to be used for the application. The entire archived data applet modules and the set of JAVA-based socket communication modules were prototyped on the real-time telemetry monitoring system. These were deployed and running well on advance of a first deployment of the invention. This also included the prototypes for the specialized archived data graph displays. The merits of code object oriented reuse are apparent.

The eTlmAlertServer 45 implements the RemoteAlertSource 46 interface and preferably supports all or a portion of the following functions: syncRequestAlerts( ) and asyncRequestAlerts( ). One of the server's main responsibilities is to retrieve both real-time and archived alerts from the MySql database. The server is integrated with the JAVA interface to the MySql database, and based on the user-supplied filter mechanism designed into the AlertData serializable object the server polls the database for the appropriate result set and returns the result set in the AlertRbData serializable object back to the client.

Each of the serializable objects preferably incorporates a mechanism that tracks the last row received from the index alert database as a function of site. This information may be constantly maintained in both the AlertData input object and the AlertRtnData object to guarantee that the server takes full advantage of the index database mechanism for optimized searches.

As mentioned earlier, the eTlmAlertServer 45 manages its own threaded pool and handles both synchronous and asynchronous requests from the client. This enhanced functionality is preferably incorporated into the server design because of the complexity involved with handling real-time database interaction.

The eTlmAlertServer 45 takes advantage of the second preferred implementation of a method of implementing a secure technique of communications with a mission critical Tier 3 TT&C legacy server from within an enterprise application. Here, the eTlmAlertServer 45 accesses mission critical Tier 3 data from a deployed open-source relational database without having to establish any direct communications with the Tier 3 servers. Tier 1 to Tier 2 http tunneling completes the design communication scheme in the same fashion described above. The manner in which the relational database communicates with the Tier 3 servers is described in greater detail below with reference to a Tier 2 discussion.

The eTlmCmdServer 47 implements the RemoteCmdSource 48 interface which preferably supports all or a portion of the following functions: syncRequestCmds( ) and asyncRequestCmds( ). One of the server's main responsibilities is to retrieve the real-time pending command lists from the MySql database as a function of a user-defined site specification. The server may be integrated with a JAVA interface to the MySql database, and based on the user-specified site field supplied by the CmdData serializable input object the server polls the database for the appropriate result set. The result set is returned to the client in the CmdRtnData serializable output object. The design of the database supporting the site dependent pending command lists does not require the tracking mechanism used for alerts in order to optimize searches on the indexed database.

As mentioned earlier, the eTlmCmdServer 47 manages it own threaded pool and handles both synchronous and asynchronous requests from the client. This enhanced functionality is preferably incorporated into the design of the server because of the complexity involved with handling the real-time database interaction. The eTlmCmdServer 47 may use the same technique the eTlmAlertServer 45 uses for secure Tier 3 communications.

Other Tier 2 components are depicted at the lower and lower left portion of the Tier 2 diagram in FIG. 4. In the middle of the diagram, a UNIX-based legacy TT&C shared memory inter-process communications (IPC) segment is displayed. All real-time updates of telemetry text and graph displays require access to this IPC segment. This is an essential module supporting the real-time egment of the application. A fleet of 16 geosynchronous satellites generate up to approximately 32 frames of active telemetry every half second. For any given satellite, as many as 10,000 different telemetry points may be maintained and updated within this shared memory segment. The shared memory segment is preferably accessible from both JAVA- and C-based software modules. The C-based modules may include a full-featured interface to shared memory intrinsic to the UNIX-supplied TPC system modules.

Since JAVA does not have a core set of classes to access shared memory, the application makes use of the invention's customized interface using the JAVA Native Interface (JNI) 57 API to accomplish this. Diagram 4 displays that eTlmTextServer 41, eTlmAppServer 43, and eTlmGraphServer 39 access shared memory using this customized TNT interface module. This interface allows for real-time access to current values for all telemetry mnemonics, which in the aforementioned example maybe as many as 10,000 items per frame per spacecraft for the entire fleet of geosynchronous satellites. These values may be periodically updated (e.g, as often as every 0.5 seconds) depending on the telemetry rate of any particular satellite.

The JAVA-shared memory interface takes advantage of an indexing scheme designed to optimize retrieval of data based on spacecraft index and telemetry index pairs. Any client request coming from the eTlmClientApplet[15] may be immediately mapped to an aggregate of spacecraft index and telemetry index pairs. Preferably, the serialiazable input and output object fundamental to the RMI client server protocol are embedded with the spacecraft index and telemetry index aggregates to ensure that the mapping occurs only with the incipient request for continuous real-time telemetry. Subsequent requests can retrieve data directly from shared memory based on the supplied index pairs contained in the serializable input objects coming from the client. The customized JNI 57 interface preferably supports all or a portion of the following functions: retrieve(int scIndex, telemetryIndex( ), getSatID( ), getMnemonicsID( ), getMnemonics( ), and getOOLMnemonics( ). Observe that the customized JNI 57 interface may be engineered for optimized retrieval based on the indexing scheme described above.

A customized C-based API may be employed within the application for the C-based modules that need to initialize, maintain and update the UNIX-based IPC segment. FIG. 4 shows C-based modules that may be deployed on Tier 2 requiring access to shared memory: 1-N local tpuprocs 50 and 1-N ScCollectorProcs 51. Other C-based modules and TCP/IP servers deployed on Tier 2 as shown in FIG. 4 include: eTlmWALServer 52, eTlmWCLServer 53, eTlmPDDServer 54 and eTlmPDD2Server 55. The responsibilities of these servers revolve around communications to the Tier 3 legacy WAN TT&C servers.

The invention uses a customized JDBC interface in conjunction with the open-source JDBC driver to support the eTlmCmdServer 47 and eTimAlertServer 45 required access to the MySql open-source relational database 60. Using the JDBC API 56, the customized application interface provides a composite of class methods required to connect, disconnect, create databases, create tables, insert, delete, retrieve database, retrieve columns, retrieve tables and execute queries.

Although the JDBC design for the interface to the MySql product is full featured, the primary roll of the customized JDBC interface from the perspective of the RMI servers is to retrieve information as a function of user defined query criteria. As such the application supports the JDBC connection to the database as a function the following parameters: hostname, port, username, password, class name, driver name and URL. The class name is the "org.gjt.mm.mysql" class specification of the open-source driver used to interface with MySql. Other important fields related to the connection to the MySql database are driver name ("jdbc:mysql") and url (dbc:mysql://IIP address). Once the interface makes the connection, a JDBC Statement object with the associated executeQuery method is employed based an application generated SQL query utilized to generate the JDBC ResultSet object containing the information returned from the relational database based on the user defined query.

Similar to the customized JAVA interface to the MySql database, a preferred embodiment of the invention includes a full-featured C-based interface to Mysql 57. As with the JAVA interface, the C-based interface is engineered to connect, disconnect, create databases, create tables, insert, delete, retrieve database, retrieve columns, retrieve tables and execute queries. The do_connect( ) function connects to the MySql database as a function of specified host name, user name, password, port number, socket identifier and database name.

Once the connection is made, the appropriate C-based Tier 2 servers (eTlmWALServer 52 and eTlmWCLServer 53) perform appropriate updates to the respective alerts_db and cmds_db databases using the following subset of interface function calls: process query( ) and process_resultset( ). The process query( ) function call is the module that the aforementioned C-based servers use to update the indexed databases. The tables may be updated using an appropriate SQL update command to guarantee optimal performance without excessive table manipulations, to thereby rebuild the index table within the application database.

The JAVA and C software interface to MySql are the respective Tier 2 and Tier 3 interfaces to the invention's designed software architecture for supporting this unique TT&C WAN distributed shared memory segment design. Unlike the UNIX-based C shared memory segment supporting real-time telemetry, the application demands require a robust client/server-based shared memory segment accessible to both JAVA-based TT&C servers and C-based TT&C server. In addition, the shared memory segment requires it to be platform-independent while concurrently supporting multi-threaded/multi-process shared memory access.

Platform independence is a highly desirable Tier 2/Middle Layer enterprise feature. The customized design which includes the C/JAVA interfaces to MySql and the MySql relational database overcomes many limitations of existing UNIX-shared memory interface schemes, existing single threaded/serial processing client/server C-based TT&C telemetry archival systems, and many problems associated with the inter-process communications of JAVA-based RMI servers with C-based TCP/IP servers. In addition, the MySQL-based distributed WAN TT&C shared memory segment is concurrently open source and outperforms all leading commercially available and open-source relational databases for the many industry standard benchmarks associated with the performance evaluation of relational databases. This unique design approach for archived data gives the invention an infrastructure that can readily be deployed to provide a repository for live telemetry or archived telemetry.

An alternative embodiment to the present invention could also serve as a real-time distributed shared memory segment similar to the legacy TT&C shared memory segments that are currently deployed, but do not support distributed access without the introduction of additional resources. In addition, a prime candidate to take advantage of the expansion of the invention's archived data functionality supported by the deployed MySql architecture is the 72-hour fleet transponder data.

More specifically, instead of the flat-file system used to support the 72-hour fleet transponder data for outside customers, the MySql database could be used and easily expanded to provide the entire fleet's transponder data for a predetermined amount of time (e.g., up to six months) with a resolution that reflects the frame rate of the individual satellites that make up the fleet of geosynchronous satellites. Here, outside customers could be provided an alternative to accessing the mission critical archival system and simultaneously benefit from a system with a multi-threaded access that overcomes the first come, first served serial processing approach.

An attractive attribute of storing data for outside customers in this proposed fashion is that the data access will preserve the mission critical HEART system for internal use and will not require allowing outside access to HEART compromising internal TT&C network security by exposing port information and IP addresses to outside users (see the discussion of HTTP tunneling above). The resident compression and backup capabilities of the MySql relational database make it an ideal candidate to serve the proposed enhancements to the current invention with respect to data storage and uniquely accessible data exchange.

The current MySql database design may include the following two databases: alerts_db and cmds_db. The alerts_db database is an index implementation of 250,000 rows of TT&C alert entries with the following column entries: row index, alert priority index, alert site index, alert node index, unix time long format, unix time string format and alert string. The alert_db database may have an additional table designed to track the current row index counter because the database is designed to be a circular buffer of 250,000 entries that will be written over as entries populate the database in access of the design capacity. This allows the storage of the most recent 250,000 alerts in an update only fashion thereby insuring the optimized index access is never compromised with table regeneration subsequent to inserting new or deleting old database entries. This was designed to take full advantage of indexing without the associated degradation involved with write related insert and deleted activities.

The cmds_db database is designed to perform as an aggregate of site dependent stacks with all the commanding sites within the legacy TT&C WAN having their own dedicated stack table and stack status table. As such, the database currently is comprised of a number (e.g., 10) of different TT&C site stacks. The design provides for each of the site dependent stacks to be created and initialized to accommodate a maximum of 500 possible command entries. The associated site dependent stack status tables track current stack status and the number of commands associated with the most resent compliment of pending command lists distributed via TCP/IP server communications from the respective legacy TT&C site master servers.

While the enhanced eTlmAlertServer 45 and eTlmCmdServer 47 RMI servers provide for Tier 1 JAVA-based access to the relational database, the C-Based eTlmWALServer 52 and eTlmWCLServer 53 servers provide Tier 3 access to the relational database of the invention. More specifically, the eTlmWALServer 52 is preferably a customized TCP/IP server that connects as an "ALERT_CLIENT" to the MasterServer 14 located on the Control WorkStation located on the local TT&C Tier 3 LAN segment proximal to the Tier 2 application web server. The web alert logger server (eTlmWALServer 52), receives all the WAN TT&C alerts over this single connection to the MasterServer 14.

Upon receiving an incoming alert, the eTlmWALServer 52 updates the appropriate index position of the alert_db database. The server always has a reference to the current position within the alert_db ring buffer. The eTlmWALServer 52 is also responsible with maintaining the connection to the MasterServer 14 on the designated control workstation, and in the event that the remote Master Server connection has terminated for any reason the eTlmWALServer 52 will gracefully shutdown the old connection and start a new connection when the MasterServer comes up for service again. The same connection management is required for the TCP/IP connection to the relational database. The eTlmWALServer 52 preferably supports all or a portion of the following set of TCP/IP legacy TT&C communication message processing: MSG_CONNECT, MSG_NEXT_LiNE, MSG_CLEAR_SCREEN and MSG_DISCONNECT.

The software and network architecture supporting the eTlmWCLServer 53 is slightly different than that of the eTlmWALServer 52 dedicated to alerts. The eTlmWCLServer preferably connect to all of (e.g., the 10) Tier 3 Control Workstations supporting the TT&C WAN fleet spacecraft commanding via the (10) different site MasterServers 14. The eTlmWCLServer 53 connects to each of the different MasterServers 14 and registers as an "ANALYST_CLIENT". The MasterServer 14 at a commanding site will forward the pending command lists as soon as the local controller summons up a list prior to commanding one of the fleet satellites.

The eTlmWCLServer 53 tracks what socket connection is connected to which site and loads the appropriate site dependent command stack within the cmds_db database as soon as the pending commands are received in. The cmds_db site dependent stack status tables may be uploaded at the same time. With the information stored in both tables, the eTlmCmdServer 47 on the RMI side of the communications scheme knows just when and how much of the site dependent command tables to send the eTlmClientApplet 15 clients on Tier 1. The eTlmWCLServer 53 manages and maintains a connection status table for all the remote site master servers and the local relation database server to ensure uninterrupted service.

Two additional C-based servers are used to manage realtime access to fleet telemetry data as it comes down from all the geosynchronous satellites in the fleet. In addition to managing the telemetry frames for these satellites, the C-based servers process the state information associated with each telemetry item in the current telemetry frame. The state information associated with each telemetry item in a given frame is the mechanism used to alert the controllers and analysts that certain spacecraft parameters are out of limits.

Because most of the fleet satellites transmit two streams of telemetry every predetermined period of time (e.g., 0.5 seconds), the invention may use two TCP/IP servers, namely the eTlmPDDServer 54 and the eTlmPDD2Server 55, for processing the processed frames of the entire fleet. These TCP/IP servers are the sole source of real-time telemetry and out-of-limit messages from Tier 3 of the legacy TT&C WAN of servers. TCP/IP messages supported by these services include MsgAck, MsgConnect, MsgConnectDec, MsgGetData, MsgSendProcessedData, MsgSendTelemetryStates, MsgTpuStatus, and MsgServiceActive.

Each eTlmPDDServer 54, 55 comes into service to accept connections with Tier 3 processed data processors and receive incoming MsgProcessedData messages that are coordinated as a function of a scid (spacecraft identifier). In addition, the eTlmPDDServers 54, 55 also accept MsgTelemetryState messages, which are the messages, associated with the out-of-limit conditions coming in from the Tier 1 processed telemetry processor. These MsgTelemetryState are also coordinated as a function of scid. The eTlmPDDServer 54, 55 that receives remote incoming telemetry related messages may also service local requests for these telemetry related messages as a function of scid.

To better understand how this all works, FIG. 4 shows the eTlmPDDServer 54 and the eTlmPDD2Server 55. More specifically, this figure shows that coming in from Tier 3, there are 1-N tpuproc 50 connections from the telemetry monitoring system located in the legacy TT&C real-time telemetry monitoring system (VWS). The same tpuprocs 50 that process processed telemetry for the Tier 3 real-time system will forward these frames to the one of the Tier 2 eTlmPDDServers 54, 55 using an MsgProcessedData message. The associated scid tracks these incoming MsgProcessedData and MsgTelemetryStates.

FIG. 4 also shows1-N local tpuproc 50 connections to the two eTlmPDDServers 54, 55. This represents the N Tier 2 local tpuprocs that are always running and based on a designated scid will retrieve each incoming MsgProcessedData and MsgTelemetryStates and update the UNIX-based shared memory segment with the appropriate changes. The design of the tpuproc 50 C based process was engineered so that the same application software will run on the Tier 3 or Tier 2 without software changes. To accomplish this, the tpuproc 50 processor may be designed to support a predetermined number (e.g., 5) different start up modes of operation:

| |
|---|
| NO_FORWARDING |
| WEB_FORWARDING 1 |
| WEB_FORWARDING2 |
| WEB_PROCESSING1 |
| WEB_PROCESSING2. |

The first mode (NO_FORWARDING) is the default Tier 1 mode of operation. This forces the tpuproc 50 to process frames using a remote telemetry source (telemetry processing unit) for telemetry updates and requires it updating shared memory with all updates.

The second mode (WEB_FORWARDING1) is an alternative TIER 1 mode and is the same as the NO_FORWARDING mode with respect to Tier 1 but the process must now connect to the eTlmPDDServer 54 forwarding all incoming frame and frame state messages the Tier 2 server.

The third mode (WEB_FOR WARDING2) is exactly the same as the second but the processor will forward all frame and frame state messages to the Tier 2 eTlmPDD2Server 55.

The fourth (WEB_PROCESSING1) tpuproc 50 mode is a Tier 2 mode where the processor will obtain telemetry frame and frame state messages from the local eTlmPDDServer 54, 55 telemetry source and update TIER 2 shared memory accordingly.

The fifth mode (WEB_FORWARDING2) will force the tpuproc 50 to obtain telemetry frame and telemetry frame state messages from the local eTlmPDD2Server and update Tier 2 shared memory accordingly.

FIG. 4 also shows 1-N ScCollectorProcs 51. These are C-based utilities designed to store and maintain the 72-hour outside customer archived transponder data for all the spacecraft fleet. This alternative archival mechanism dedicated to outside customer needs of archived telemetry data may be deployed in an attempt to mitigate loading on the HEART archive system from outside customers, while concurrently preserving security of mission critical internal TT&C resources.

This archiving mechanism is based on a simple spacecraft-dependent flat-file scheme where each flat file performs as a 72-hour circular buffer of all transponder data for the specified spacecraft. An indexing technique is employed to facilitate traversing these files in search of specific transponder entries. With the introduction of the MySql database, this storage mechanism could be supplanted and the relational database could store considerably more data to support the TIER 2 archiving of customer transponder data.

From the preceding discussion, it is apparent that the Tier 3 segment of the N-Tier enterprise design is really a multi-tiered Data Layer portion of the N-Tier legacy WAN TT&C architecture. Tier 3 really involves a predetermined number (e.g., 16) of different tiers which may include the following separate nodes: PRCNTL, VVCNTL, V2CNTL, WBCNTL, SMGNTL GBCNTL, LRCNTL, NACNTL, GJCNTL, HICNTL, VVXVIDEO, VVXVID2, V2XVIDEO. PRHEART, VVHEART and WBHEART. Recall that a tier is defined as a functionally separate hardware and software component that performs a specified function. Based on this definition the invention may integrate 18 different tiers of communication in a trulyunique design. If desired, however, a different number of tiers may be implemented depending on the intended application of the invention and its attendant requirements.

The object-oriented JAVA implementation used by the present invention has made significant use of the code reuse advantage inherent with any object-oriented system. Many of the eTlmClientApplet[15] panels were derived from existing legacy TT&C applications.

Specifically, in a prototype the entire GUI and set of communication modules used in the inventions archived data panel and RMI server were first introduced in the legacy TT&C telemetry monitoring system. In a reversal of code reuse, the enterprise application's graphical panel supports a tabularized presentation that allows for easy dynamic modifications to the pre-configured settings for the supported graphical displays which was retrofitted back into the legacy telemetry monitoring application. Finally, most of the display modules support a multiple deployment mode of operation, which allows them to be used, integrated in the enterprise application or alternatively be deployed as a standalone application display.

The versatility of the invention allows for many alternative embodiments, which include a full-featured training system that supports not only simulated telemetry cotemporaneous with real time telemetry from within the same application session but many other training specific functions as well. For instance, because of the integration with the Tier 3 legacy archival system the application could easily be enhanced to request raw telemetry frames instead of processed telemetry points. This version of an alternative embodiment supports raw telemetry requests using the invention's modules supporting archived data requests to and from the legacy TT&C system's archived data server. The resultant request would be used with the TT&C control workstation replay utilities to initiate a historical data stream suing a specified legacy telemetry processing unit (TPU) that is uniquely designed to handle real-time or historical telemetry frames.

Once the TPU is processing historical frames, the Tier 2 application architecture already handles real-time, simulated and historical telemetry processing in the current preferred embodiment. Just 4 lines of code change and it will serve as a full-featured front end to a TT&C training platform once the addition TCP/IP communication is introduced between the Tier 2 web server and the TPU. The current Tier 2 C-based TCP/IP resident communication modules make this a single afternoon enhancement.

An alternative embodiment could provide for enhancements to introduce the optional fleet control or subset of fleet control functionality currently provided exclusively on the legacy TT&C systems control workstation. This would require a more extensive set of enhancements but the architecture currently resident in the disclosure of this invention anticipates enhancements with the distributed shared memory functionality supported by the addition of the MySql relational database. Current legacy TT&C application functions and servers rely on UNIX shared memory facilities to make mission critical commanding information accessible to multiple processes all the time. The MySql database, in addition to the TIER 2 modules supporting UNIX shared memory access, makes the enterprise application ideally suited for these types of future enhancements. To accomplish this would require one server on the legacy control workstation to constantly monitor local shared memory updates and update the TIER 2 relational database as changes occur. This would make sure that the functionality currently existing on the control workstation could be incorporated into the enterprise application without losing track of the shared memory updates, which are fundamental to the existing legacy satellite control applications. The infrastructure for this type of implementation is already used to support the TT&C alerts and TT&C pending commands. The integration of a subset of the fleet control functionality could be done incrementally starting with command creation and expanded only if needed.

Finally, as mentioned previously, the N-Tier enterprise application has been integrated with an open source J2EE application server environment (JBOSS). A future embodiment of this invention may include a greater integration with this or other open source J2EE application servers. J2EE application servers are to enterprise N-Tier application services what Http servers are to browser based HTTP services. J2EE application servers support 13 or more core technologies including JDBC (Java Database Connectivity), JNDI (Java Naming and Directory Interface), EJB (Enterprise JAVA Beans), JSP (Java Server Pages), Java Servlets, XML, JMS (Java Message Services), JTA (Java Transaction Services), JavaMail and JavaBeans Activation framework. Since the application has already been integrated to run as a deployed J7BOSS web application (ttc.war), the invention anticipates further enhancements to the core open source resources.

The recent announcement by the Apache foundation plans to release a J2EE server called Geronimo, which would include collaboration from the team that supports and develops JBOSS, is further testimony to the wave of the future. The critical mass behind open source products is growing. Additional testimony is provided in a recent enterprise software journal (ENT News) that documented the open source Apache HTTP Web server hit a record high market share in August 2003 serving 63.72 percent of all domains. Microsoft's IIS Web server was second with only 23.75 percent of the domains served as reported by a Netcraft survey. The inventions integration of premium open source enterprise components resources gives it intrinsic infrastructure flexibility for future enhancements without the expensive dependence on over-inflated commercial enterprise products.

SOME ADVANTAGES

To better appreciate the advantages which the enterprise application design of the present invention offers as it relates to web-based geosynchronous fleet management applications, understanding multi-tier design trade-offs is imperative. Consider, for example, the benefits of an N-tier design versus a 2-tiered design. A 2-tiered telemetry processing internet application is founded on a simple client-server architectural paradigm. A client, running in the browser of a computer with internet access, establishes and maintains a connection to a mission critical server using the appropriate IP address and service port number. While the simplicity is appealing, this approach suffers from a plethora of disadvantages.

First, 2-Tier applications place substantial loads on mission critical networks supporting web-based client/server communications.

Second, web-based clients requiring lengthy transactions that lock other clients out when connecting directly to mission critical application data source servers generate server bottlenecks interfering with the primary objectives of the existing legacy mission critical TT&C servers. Typically, this introduction of excessive web-based client demand and loading occurs concurrently with the ever growing mission critical application demands yielding disastrous results.

Third, while a 2-tier system may circumnavigate problems associated with lengthy client-server transactions, they could have prohibitively expensive hardware solutions that may be insufficient in terms of scale for meeting the demands of even very narrow and specialized application objectives.

Fourth, due to the aforementioned limitations of the web-based functionality of 2-tier designs, application scalability and manageability problems escalate as usage exceeds capacity and application performance degrades commensurately as demand grows.

Fifth, opening up IP address/port service links to mission critical servers through corporate firewalls for external users or internal users, even with password protection, is unheard of in today's Internet environment.

Any of the aforementioned disadvantages may be enough to disqualify a two-tier approach from serious consideration when designing a full-featured geosynchronous satellite application.

An N-Tier system design (N>2) overcomes all the aforementioned disadvantages associated with the 2-tiered approach. N-tiered system architecture starts minimally with the introduction of a third software non-mission critical architecture tier running autonomously on its own non-mission critical hardware server. This substantially reduces the functionality required to be supported by the web client.

Concurrently, the load introduced by the traditional client/server design support of direct connection of web-based clients to mission critical TT&C servers is supplanted with client loading on middle-tiered non-mission critical application servers. Since the functionality associated with the web-based client is significantly reduced, the web-based client is liberated to support an expandable set of multi-threaded data presentation functions, while contemporaneously increasing the full-featured graphical user interface client functions supported by the TIER-1 application applet.

At the same time, the addition of the non-mission critical middle software tier allows middle-tier application software to cache local information mirrored from the mission critical servers, thereby reducing the load of the mission critical LAN segments significantly. Caching data products on the middle tier not only reduces the loading and network throughput required by the mission critical LAN segments, it optimizes response time for all client requests.

Furthermore, the introduction of the middle tier allows system designers to set up a multitude of middle tier processor deployments based on an expandable set of middle tier layers dedicated to supporting the load balancing and tier 3 data caching required by a scalable full featured geosynchronous fleet management application. As the application demands and user base grows, the middle tier software and server architecture expands to meet these demands without adversely impacting the mission critical tier 3 legacy TT&C servers. N-Tier systems gracefully grow from very modest server resource configurations to very large server configurations without jeopardizing the stable operation of the mission critical TT&C application servers and their associated LAN/WAN segments.

Additionally, N-Tiered applications offer the ability to employ client proxy communication schemes preserving the security to mission critical assets compromised by the two-tiered architectural approaches. In accordance with at least one embodiment of the present invention, each tier may be considered to be a functionally separate hardware and software component that performs a specific function in providing access to archived satellite-based (e.g., TT&C) data.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. An N-tiered enterprise system for managing satellite fleet information and commands, comprising:
    one or more terminals operating Tier 1 software layers;
    one or more application servers operating Tier-2 software layers; and
    a plurality of Tracking, Telemetry and Control (TT&C) data resources operating Tier 3 software layers dedicated to storing and/or processing satellite-based data, wherein the Tier-2 application servers control Tier-1 terminal access to the satellite-based data stored and/or processed in Tier-3-Tier N real-time, simulated, playback and archived data resources.

2. The system of claim 1, wherein the Tier-1 software layer is comprised of a client application applet and/or graphical user interface comprised of the following components:
    a graphical user interface providing enterprise users with the plethora of specification options required to initiate application displays dedicated to the plurality of TT&C data products;
    a collection of multi-threaded and/or multi-processed application data pop-up viewing displays (Text or Graphical) supporting the plurality of application data product formats;
    a collection of client/proxy communication software modules designed to generate application objects necessary for secure HTTP/HTTPS protocol translations; An application software module dedicated to controlling application graphical user interface features and options as a function of User ID and User Password combinations.

3. The system of claim 1, wherein the Tier-2 intermediate software layer is comprised of the following:
    one or more internal or externally dynamically deployable Tier-2 HTTP/HTTPS servers (Open Source and/or Commercial);
    an integrated suite of Open Source software products including but not limited to Apache/Tomcat, Mysql, JAVA SDK,JBOSS and ANT;
    a plurality of Tier-2 archived and real-time data sources and associated data source strategies including but not limited to relational database storage (Open Source and/or Commercial);
    shared memory data storage and flat file data storage;
    a plurality of archived and real-time data source access interfaces and drivers designed to access Tier-2 and Tier-3 data storage resources;
    a full compliment of servlet modules designed to support Tier-1 to Tier-2 HTTP/HTTPS protocol translation and Tier-2 to Tier-2 HTTP/HTTPS Server redirection;
    a plurality of Tier-2 data processors designed to initialize update and provide access to Tier 2 shared memory segments; and
    a plurality of synchronous and asynchronous application TCP/IP and RMI/RMI Activatable servers designed to support Tier-1 to Tier-2 and Tier-2 to Tier-3-Tier N inter-process communications.

4. The system of claim 1, wherein the Tier-2 software architecture provides Tier-1 terminal based clients with continuous 24-hour controlled access to fleet satellite based data.

5. The system of claim 1, wherein Tier 1 through Tier N software architecture, associated software layer modules and software layer components are stored in memory on a plurality of Tier 1 through Tier N processing units, computers, servers and/or workstations comprising a distributed processing unit configuration dedicated to providing the myriad of functions required of a full featured enterprise TT&C satellite fleet management ground system.

6. The system of claim 5, wherein distributed communication network connecting Tier 1 through Tier N distributed processing units, computers, servers and/or workstations includes an extranet dedicated to corporate affiliates and an intranet dedicated to internal corporate users; the intranet comprising: a wide area network interconnecting a aggregate of globally deployed TT&C local area networks; a wide area network interconnecting an aggregate of globally deployed corporate local area networks; and a virtual private network dedicated to intranet connectivity from outside corporate network resources.

7. The system of claim 1, wherein the Tier 3-Tier N data resources includes a plurality of legacy mission critical TT&C real-time, simulated, playback, archived satellite data sources dedicated to all functions related to TT&C satellite fleet maintenance.

8. The system of claim 1, wherein one or more deployed Tier-2 application servers configured with the associated Tier 2 software architecture layer, provides the Tier-1 terminals configured with software architecture layer, with secured access to the satellite-based data stored and/or processed by the Tier-3-Tier N data resources.

9. The system of claim 8, wherein secure Tier 1 to Tier 2 communication channels are established based on, but not limited to, HTTP/HTTPS and RMI communication protocols used in conjunction with the Tier 1 and Tier 2 communication modules, said Tier 1 and Tier 2 communication modules are further enhanced to perform HTTP/HTTPS tunneling protocol translation.

10. The system of claim 9, wherein the Tier 1 to Tier 2 secure communication channel of claim 9, wherein Tier 1 communication modules are comprised of an aggregate of client proxy object communication software components and Tier 2 communications modules are comprised of an aggregate of protocol agnostic servlet software components, wherein together these modules establish Tier 1 to Tier 2 communication links based on well known secure HTTP/HTTPS ports only thereby suppressing internal application IP addresses and port/services information from all Tier 1 clients.

* * * * *